United States Patent [19]

Nyhuis et al.

[11] 4,097,696

[45] Jun. 27, 1978

[54] METHOD AND APPARATUS FOR POLLING SECURITY ALARM INSTALLATIONS

[76] Inventors: Robert J. Nyhuis, 7806 Maiden La., Portage, Mich. 49081; Terrence F. Smith, 6903 Blair Rd., Kansas City, Mo. 64152

[21] Appl. No.: 613,173

[22] Filed: Sep. 15, 1975

[51] Int. Cl.² .................................... H04M 11/04
[52] U.S. Cl. .................... 179/2 A; 179/5 R
[58] Field of Search ............... 179/2 A, 2 R, 2 AM, 179/5 R, 175.3 R; 340/147 R, 150, 180, 151, 163

[56] References Cited

U.S. PATENT DOCUMENTS

| | | | |
|---|---|---|---|
| 3,400,378 | 9/1968 | Smith | 179/2 A |
| 3,553,376 | 1/1971 | Bogaart | 179/2 AM |
| 3,842,218 | 10/1974 | DeLuca | 179/2 A |
| 3,885,108 | 5/1975 | Zock | 179/90 B |
| 3,899,639 | 8/1975 | Cleveley | 179/2 A |
| 3,920,926 | 11/1975 | Lenaerts | 179/90 B |
| 3,922,492 | 11/1975 | Lumsden | 179/2 A |
| 3,932,709 | 1/1976 | Hoff | 179/90 B |
| 3,937,890 | 2/1976 | Blethen | 179/2 A |

Primary Examiner—William C. Cooper
Assistant Examiner—Joseph A. Popek
Attorney, Agent, or Firm—Lowe, Kokjer, Kircher, Wharton & Bowman

[57] ABSTRACT

A centrally located polling system uses conventional telephone dial networks and a means for digital telecommunication to periodically interrogate remote site alarm installations for security related information. Apparatus at the central location retrieves remote site telephone numbers from memory and controls dialing sequences to establish communication exchange between the central and remote sites. Circuit means are provided to validate the communication link, or alternatively, retry the dialing sequence. Apparatus at the remote site continuously monitors the status of a plurality of alarms and is responsive to requests from the central location by means of the telephone dial network. The remote site security status thus transmitted is received and digitally displayed in coded form at the central location.

24 Claims, 16 Drawing Figures

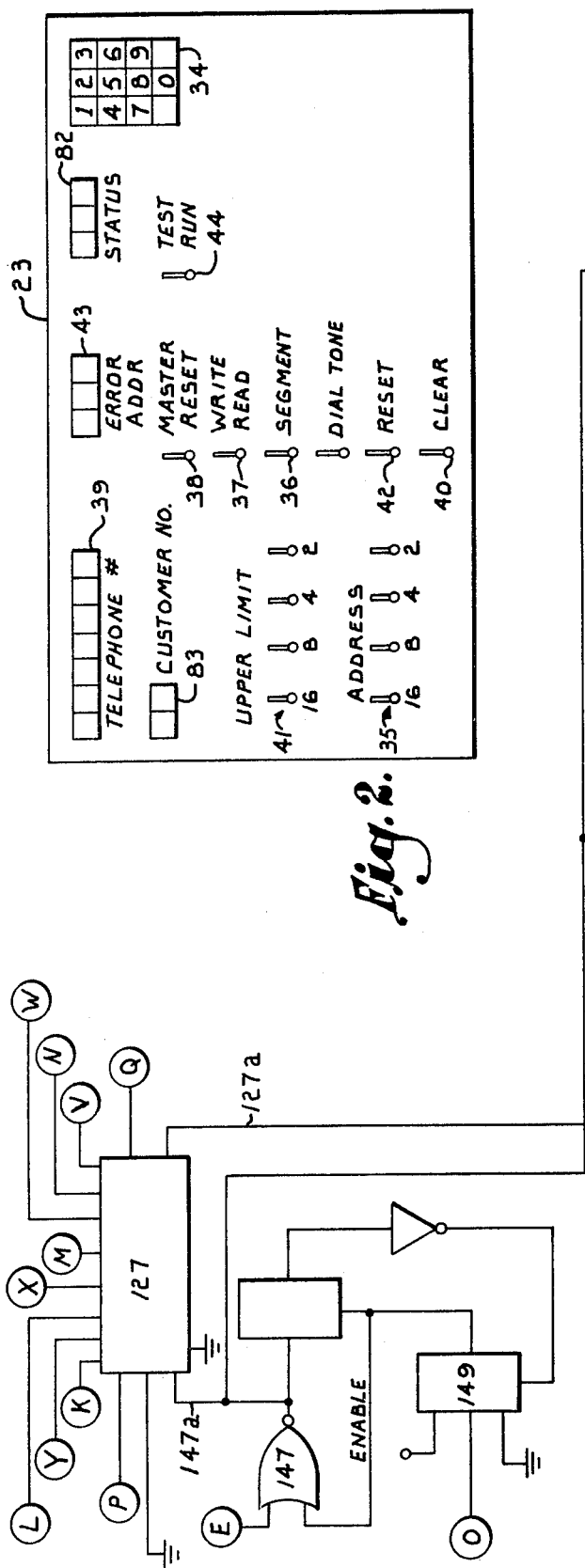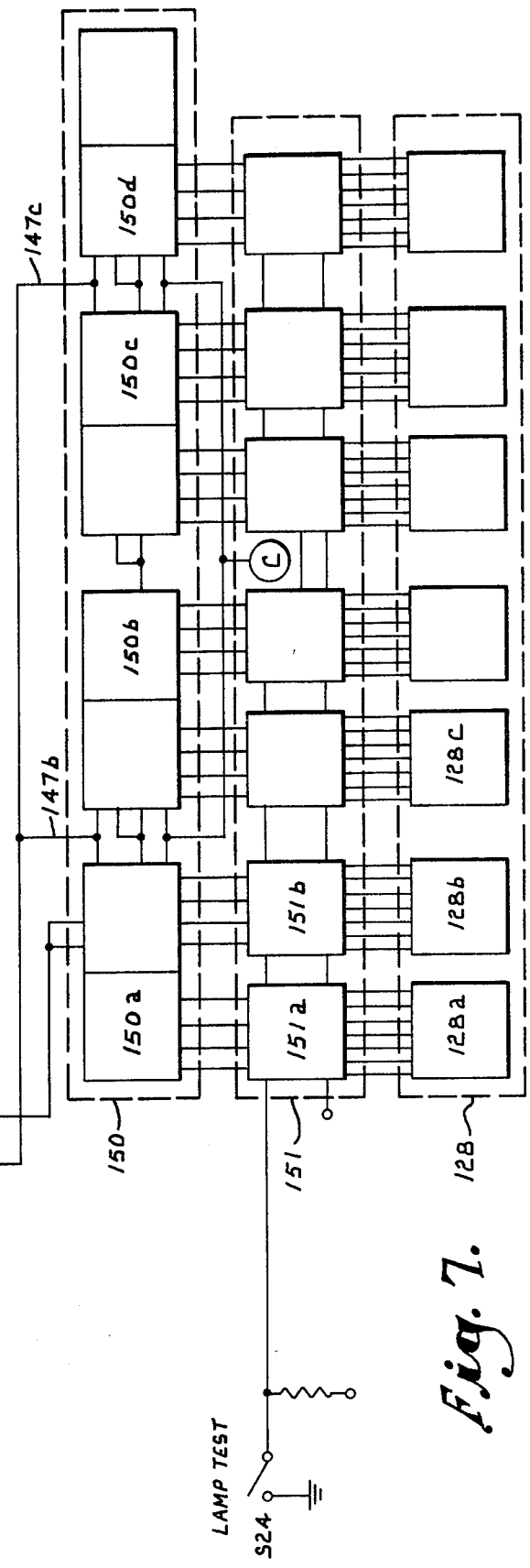

METHOD AND APPARATUS FOR POLLING SECURITY ALARM INSTALLATIONS

BACKGROUND AND BRIEF DESCRIPTION OF THE INVENTION

The use of conventional telephone network lines, communicating various forms of data and more particularly for communicating security related data is an art recognized concept. For example, one approach is to utilize an automatic dialer at the remote site. These automatic dialers usually have one or more predetermined telephone numbers that are dialed when an alarm condition occurs. When the predetermined number is reached, a pre-recorded voice message is usually played by the dialer that gives the dialer's location and the general type of alarm that has occurred. However, because the dialer plays prerecorded messages to describe its location and alarm, the means to select specific messages is limited and the quantity of detail in which the alarm condition can be described is restricted. In the event that the telephone line from the remote site becomes disabled, the dialer is precluded from reporting the alarm condition.

Another approach consists of a central monitor system that is connected to remote sites by leased, dedicated telephone lines. Lease expense is based on the distance between the central and remote sites. This arrangement restricts placement of the central monitor to specific geographic areas in order to minimize line leasing costs. The lease line approach cannot be used in localities where dedicated lines are not available for alarm monitoring use.

The invention utilizes a conventional telephone dial network and apparatus at both the central monitoring location and the remote sites to poll remote site security alarm installations for alarm status. Apparatus at the central monitoring location is referred to as an automatic dial controller and a local line controller, requests, receives and displays the remote site security status. Apparatus at the remote site which is referred to as a remote line controller collects security information from alarm systems and is responsive to requests to transmit said information to the central monitoring location. The automatic dial controller comprising a memory unit, logic circuity, and a manual control panel, stores remote site telephone numbers, controls dialing sequences and digitally displays telephone numbers as they are polled. Up to 32 seven digit telephone numbers can be entered into memory by means of a keyboard on the manual control panel. Telephone numbers can be added to memory at any time and existing numbers can be changed without altering those numbers previously stored.

Initial checks are performed to confirm that a telephone line is unoccupied and that the telephone dial network system is operational. Memory addressing circuitry selects a remote site telephone number from memory and presents the selected number to the dial network system thereby initiating a call to the remote site. If the call is not answered within a prescribed period of time, or alternatively, if a busy signal is received, an error condition results and the number is redialed. If a second error condition results, the polling sequence is abandoned and the location of the error is digitally displayed.

A call initiated by the automatic dial controller is automatically answered at the remote site by the remote line controller whereupon the answer condition is detected and control of the communication exchange is transferred to the local line controller. A binary coded key signal is delivered from the local line controller to the remote line controller to confirm the identity of the caller, thereby preventing disclosure of security status to unauthorized callers. Upon receipt of the above described key signal, security status is delivered to the central polling location and is digitally displayed in coded form at the manual control panel. If an alarm condition is detected, the automatic dial controller suspends the polling sequence and digitally displays both the telephone number and a preassigned number to indicate the identity of the remote site where the alarm condition exists. If an alarm condition is not detected, the next number stored in memory is polled. The polling sequence thus described is performed in succession on each remote site telephone number stored in memory. The telephone numbers stored in memory are polled on a rotational basis such that after all numbers have been polled in succession, the polling sequence is repeated thereby resulting in a continuous polling process.

A primary object of the invention is to provide a unique method and system for central polling of remote site security alarm installations.

Another object of the invention is to provide a unique method and system for polling security alarm installations using conventional telephone dial networks.

A further object of the invention is to provide in a system of the character described, a unique remote line controller. It is a feature of this object that the remote line controller provides an economical means for interfacing the remote locations to the dial network for transmitting security related or status data.

Another object of the invention is to provide in a system of the character described, a unique local line controller. It is a feature of this object that the local line controller permits the economical transmitting of key information to remote sites and receiving, interpreting, and effecting the display of the appropriate data.

A still further object of the invention is to provide a unique automatic dial controller means which is versatile enough to interface to a general purpose programmable computer. In this manner, the automatic dial controller would relieve the computer of controlling the polling of remote sites (or telephone numbers) but would become involved in the system operation only when the automatic dial controller reaches a particular site or telephone number.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views, and in which like reference letters are employed to indicate common electrical interconnections in the various views:

FIG. 2 is a manual control panel which forms a part of the automatic dial controller;

Figure 13:
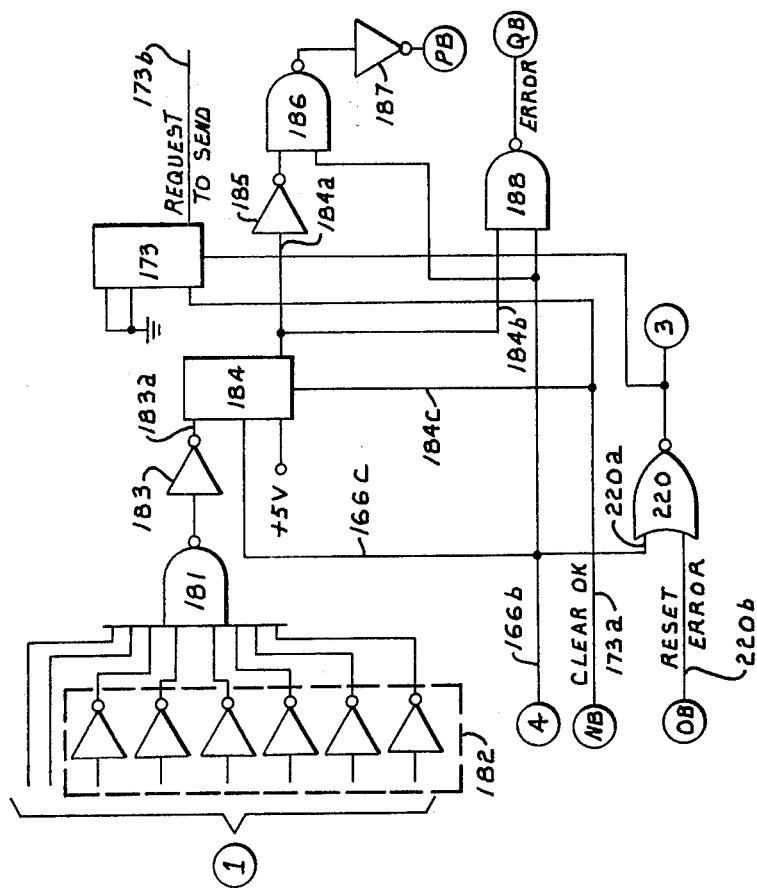
Figure 13:
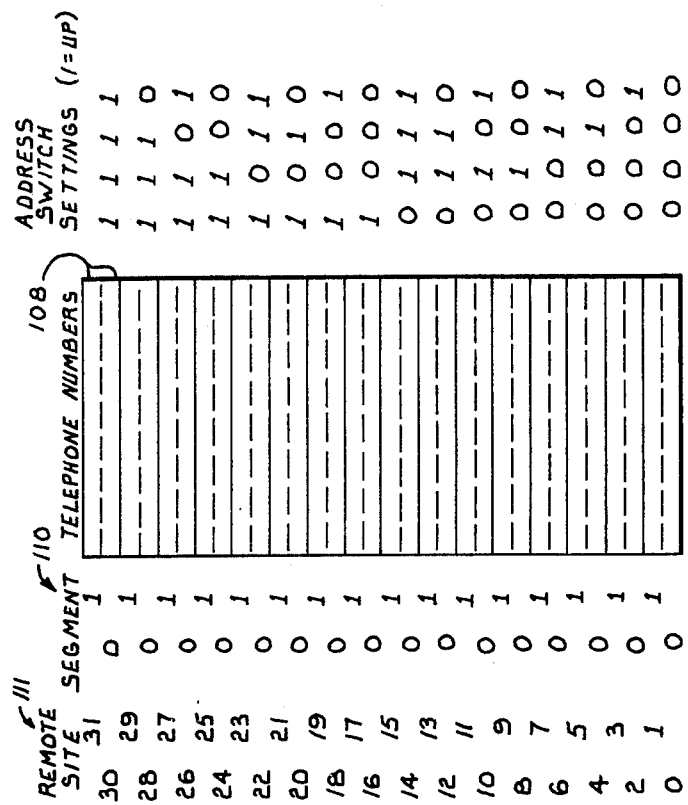
Figure 14:
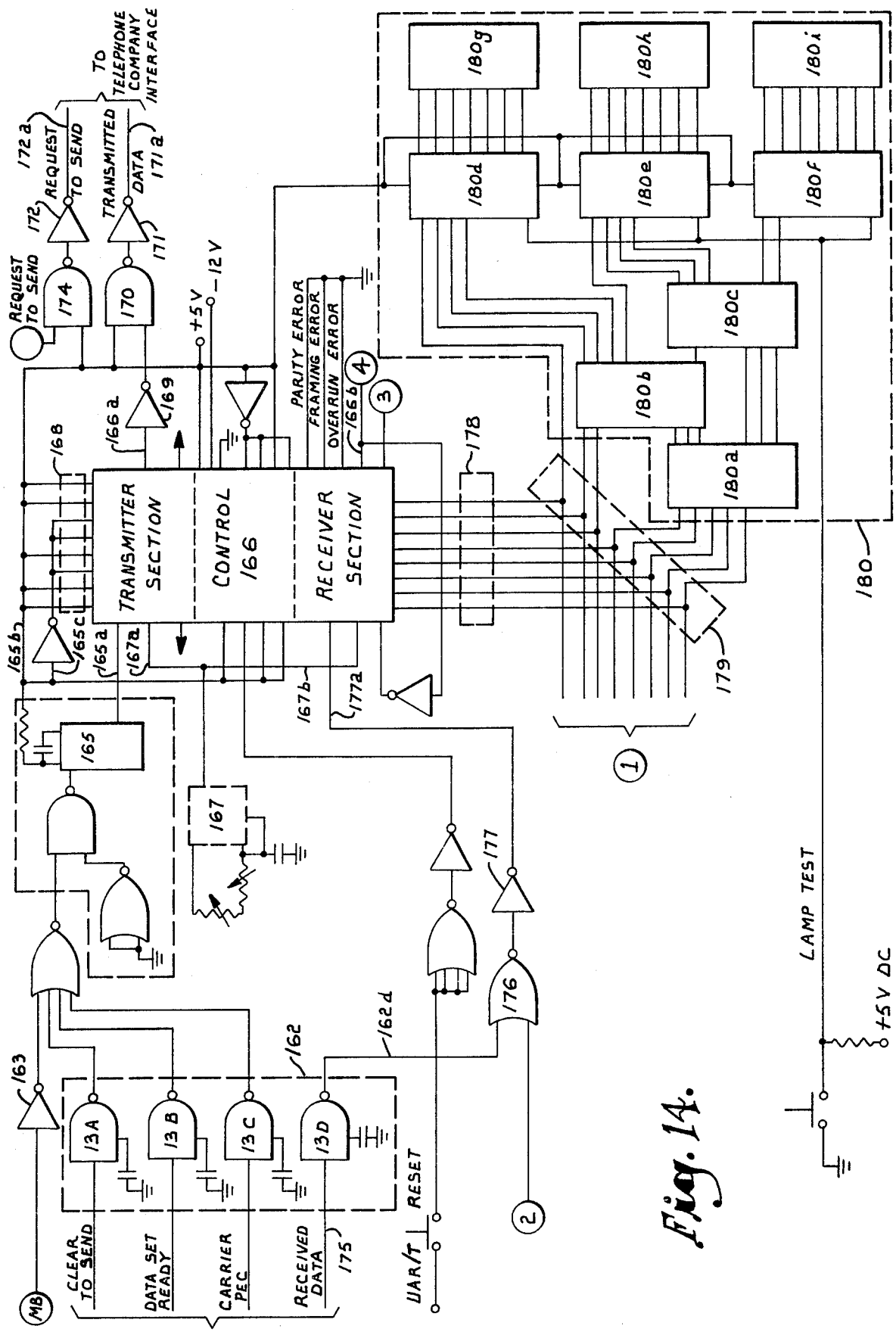
Figure 16:
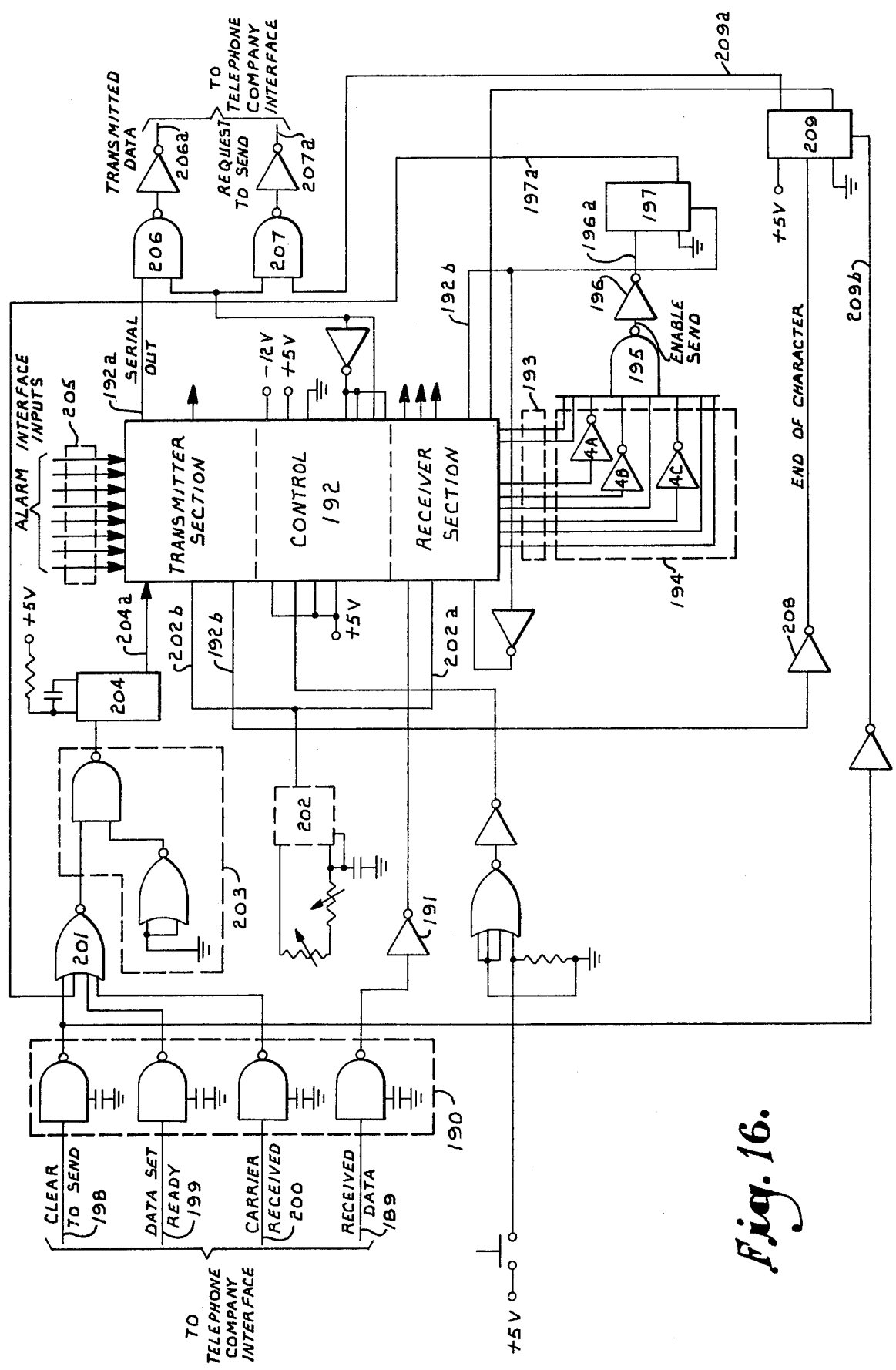

FIGS. 5, 6, 7, 8, 9, 10, 11 and 12 provide a detailed schematic diagram of the circuit for an automatic dial controller;

FIG. 13 is a conceptual diagram for organizing the automatic dial controller memory, wherein telephone numbers are stored;

FIGS. 14 and 15 are detailed schematic diagrams of the circuits for a local line controller; and FIG. 16 is a detailed schematic diagram of the circuits for a remote line controller.

Figure 1:
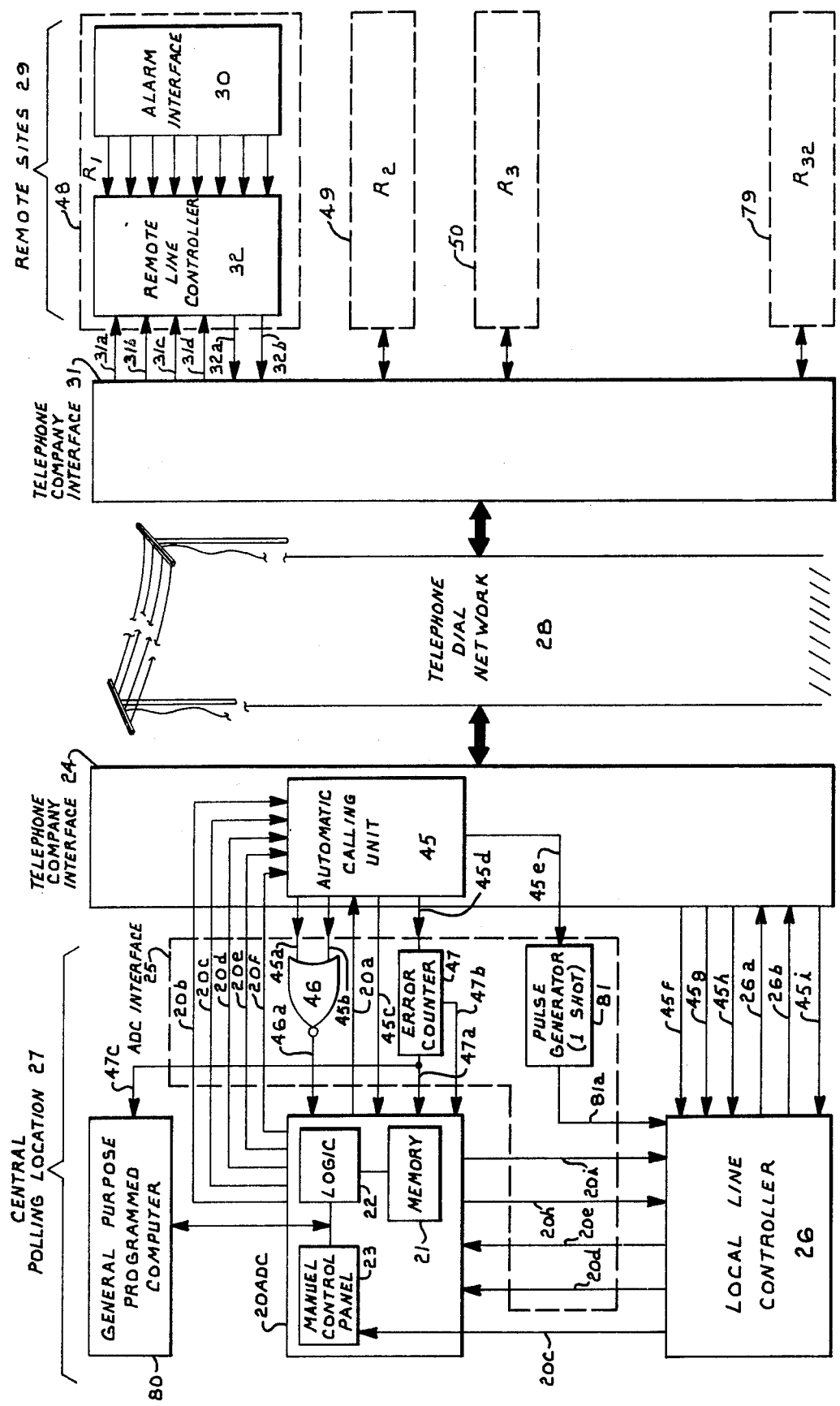
FIG. 1 is a partial block diagram of the circuit for polling security alarm installations using conventional telephone dial networks.

Turning now more particularly to the block diagram in FIG. 1, it can be seen that the polling system utilizes apparatus at both a central polling location 27 and remote sites 29. At the central polling location 27 there is included an automatic dial controller 20 and a local line controller 26, hereinafter abbreviated and referred to as ADC and LLC, respectively. The ADC 20 and LLC 26 function in concert with telephone company electrical interface 24 and ADC electrical interface 25 to store, retrieve and dial remote site telephone numbers as well as receive, process and display the remote site 29 security status. The ADC 20 has constituent elements of a memory unit 21 which functions to store remote site telephone numbers, logic circuitry 22 which functions to retrieve said telephone numbers from memory 21 and control dialing sequences and, a manual control panel 23 which provides a means to enter into memory 21 and display said telephone numbers. Communication between apparatus at the central polling location 27 and a plurality of remote sites 29 is accomplished by means of an ordinary telephone company dial network 28. At a specific remote site 48, security related information collected by an alarm interface 30 is delivered to the telephone company electrical interface 31 by a remote line controller 32 hereinafter abbreviated and referred to as RLC.

Referring now to both FIG. 1 (and FIG. 2 which depicts the Manual Control Panel 23 portion of the ADC 20), prior to initiating the polling process, the remote site telephone numbers to be polled are entered into the ADC memory 21. The address of the location in the memory unit 21 where the telephone number is to be stored is determined by positioning the binary coded address switches 35 to correspond to a predetermined memory storage scheme which will be discussed in more detail at a later time. The segment of the memory 21 into which the telephone number is to be stored is then selected by properly positioning the segment switch 36. The read-write switch 37 is placed in the write position thereby disposing the memory unit 21 to receive telephone numbers into storage and the master-reset switch 38 is "toggled" once to clear the telephone number display 39. The clear switch 40 is "toggled" once to allow the next digit to be entered from the digital keyboard 34 and the first digit of the telephone number is then entered into memory 21 by depressing the numerical key corresponding to said digit on the digital keyboard 34. The digit thus entered into memory 21 is visually displayed in the right-most segment of the seven digit telephone number display 39. The clear switch 40 is again toggled and the second digit of the telephone number is similarly entered via the digital keyboard 34. Toggling of the clear switch 40 and entering of digits via the digital keyboard 34 is thus repeated until the seven digits of the telephone number are thereby entered into memory 21. The above described sequence for entering telephone numbers into memory 21 is repeated for each remote site telephone number. Up to 32 telephone numbers can be thus stored and new telephone numbers can be added to memory 21 without altering those telephone numbers previously stored.

Having entered between 2 and 32 remote site telephone numbers into memory 21 the polling process is then initiated by manually positioning the several toggle switches indicated on the manual control panel 33. The binary coded upper limit switches 41 are positioned to select the highest address in memory to be polled, thereby defining the upper limits in the memory wherein the telephone numbers to be polled are stored. Appropriate setting of the upper limit switches 41 thus prevents retrieval of telephone numbers which are not intended to be polled and also prevents address of empty memory locations. The read-write switch 37 is then placed in the read position thereby disposing logic circuitry 22 to retrieve telephone numbers from memory 21. The error-reset switch 42 is toggled once to clear the error address display 43 and the master-reset switch 38 is also toggled once thereby clearing the telephone number display 39 and setting up an instruction in the logic circuitry 22 to poll the telephone number in the first address location in memory 21. The address switches 35 should also be in the down position.

Assume for purposes of this description that the telephone number stored in the highest memory location corresponds to that of remote site 48. The run-test switch 44 is placed in the run position thereby causing the ADC 20 to be responsive to two signals transmitted by the automatic calling unit 45 via lines 45a and 45b which are gated through NOR gate 46 and received at the ADC 20 via line 46a thereby notifying the ADC 20 that the automatic calling unit 45 is energized and is available for utilization by the ADC 20 to initiate a polling call to remote site 48. The signal on line 46a thus described is received at the ADC 20 as the commonly known dial tone. It should be pointed out that the automatic calling unit 45, hereinafter abbreviated and referred to as ACU is a device of conventional design such as model 801C manufactured by Western Electric Corporation, or its equivalent, and is commonly employed by telephone companies to place calls through telephone dial networks. Upon receipt of the above described signal on line 46a a read flip-flop in the logic circuitry 22 of the ADC 20 causes a "call request" signal to be transmitted on line 20a which is received and interpreted by the ACU 45 as a request by the ADC 20 to place a call. The ACU 45 responds to this request by returning a "present next digit" signal on line 45c thereby requesting the ADC 20 to transmit the first digit of the number to be dialed to the ACU 45. Logic circuitry 22 in the ADC 20 responds to the "present next digit" signal by retrieving the first number to be polled from memory 21 and transmitting the first digit of said number in binary form on lines 20b, 20c, 20d and 20e along with a "data strobe" signal on line 20f which the ACU 45 recognizes as an indication that a digit has been presented to the ACU 45 for dialing. Upon receipt of the "data strobe" signal the ACU 45 dials the digit thus presented by the ADC 20 and then repeats the transmission of the "present next digit" signal via line 45c thereby requesting the second digit of the telephone number be presented to the ACU 45 for dialing. The above described communication sequence consisting of the transmission of digits to the ACU 45 for dialing and receipt at the ADC 20 of the "present next digit" demand is repeated for each digit of the telephone number until all seven digits of the telephone number have been dialed by the ACU 45. The successive receipt at the ADC 20 of the "present next digit" signal via line 45c triggers a means for counting within the ADC logic circuitry which counts the number of digits thus dialed. When the count reaches seven, that is to say, after seven digits have been dialed by the ACU 45, the ADC 20 suspends operation while the ACU 45 attempts to complete the polling call thus dialed through the telephone dial network 28.

In the ACU's 45 attempt to complete the call thus dialed, one of two possible conditions will occur. The first such possible condition is that the RLC 32 at the remote site 48 is not capable of answering the polling call. This condition could result for a number of reasons. For example, the RLC 32 may malfunction or the telephone lines leading to remote site 48 could be severed thereby preventing the RLC 32 from answering the polling call. Similarly, if the RLC 32 is responding to a call other than the polling call in question, an ordinary "busy signal" will result and the polling call could not be answered. In the event that the polling call is not answered within a preset length of time, regardless of the reason therefor, the absence of an answer is detected by the ACU 45 and an "abandon call and retry" signal is transmitted from the ACU 45 via line 45d through an error counter generally indicated by numeral 47 and is received by the ADC 20 on line 47a. The "abandon call and retry" signal advances error counter 47 by one count and further causes the previously mentioned digit counter in the ADC logic 22 to reset to zero counts. Receipt at the ADC 20 of an "abandon call and retry" signal on line 47a thus causes the ADC logic 22 to successively redial the telephone number of remote site 48 prior to dialing the telephone number of remote site 49. In the event that the RLC 32 at remote site 48 is incapable of answering the second polling call, a second "abandon call and retry" signal is transmitted from the ACU 45 on line 45d through error counter 47 thereby advancing said counter to a count of two and resulting in a signal being sent from the output of counter 47 to the ADC 20 via line 47b or, alternatively, to a general purpose programmed computer 80 via line 47c. Upon receipt of said signal on line 47b the ADC 20 will suspend the polling sequence and will cause the location of remote site 48 to be visually displayed on the manual control panel 23 by means of a two digit display identified as error addr 43.

To illustrate the above mentioned operating principle, assume hypothetically that the telephone lines leading to remote site 48 have been cut thereby disabling the RLC 32 and precluding an alarm condition thereat from being reported to the central polling location 27. Under these conditions the initial polling call would not be answered. The ADC 20 would immediately initiate a second polling call which would also go unanswered whereupon the ADC 20, rather than polling the next remote site 49 telephone number, would display a number indicative of the "unanswered condition" on the manual control panel 23 and would cease further polling operations thereby calling the polling operator's attention to the condition.

The second and more common condition resulting when the ACU 45 places the polling call is that the RLC 2 at remote site 48 will answer the call. In this event, the answer at remote site 48 is detected by the ACU 45 thereby resulting in a "data set status" signal being transmitted via line 45e and delivered to the pulse generator 81 which is essentially a one-shot multivibrator. As shown, the output of pulse generator 81 is delivered to the LLC 26 via line 81a. Also delivered to the LLC 26 by the modem from telephone company interference 24 are three signals indicated by lines 45f, 45g and 45h which are essentially indicative of the status of the telephone company dial network. The simultaneous presence of signals on lines 45f, 45g, 45h and 81a, causes circuitry within the LLC 26, which will be discussed in detail at a later time, to trigger the transmission of a "key signal" in the nature of a binary number. This "key signal" is shown as emanating from the LLC 26 on line 26a and is received at the telephone company interface 24 along with a companion "request to send" signal on line 26b. The above described signals on lines 26a and 26b can be said to be companion signals. The "request to send" signal must be presented first and is acknowledged by the telephone company interface 24 providing signals on lines 45f, 45g and 45h. As mentioned earlier, the presence of these signals along with the signal on line 81a will cause a transmission of data (via line 26a) through the dial network.

The "key signal" received at the telephone company interface 24 is transmitted through the telephone dial network 28 and is delivered by the telephone company interface 31 to the RLC 32 via line 31a. The RLC 32, using circuit means which will be discussed in detail at a later time, converts the "key signal" from bit serial data to parallel data format, decodes said data, and determines the validity of the key signal thus received. The purpose of the "key signal" discussed above is to identify the caller and thereby prevent disclosure of security status to unauthorized callers. Since the invention utilizes a conventional dial network, the remote site telephones are publicly accessible in that any caller knowing a specific remote site telephone number may dial said number and thereby cause the RLC 32 at that site to automatically answer the call. However, unless the caller can present the coded "key signal", the RLC 32 will not divulge the security status data. Furthermore, unless the caller presents the key signal within a prescribed period of time, circuit means within the RLC 32, which will be discussed later in more detail, provide for automatically disconnecting the call thereby preventing the caller from "tying-up" the telephone line used by the RLC 32.

The RLC 32 receives parallel type data in the form of an 8 bit binary word from alarm interface 30 which is indicative of the security status of the respective alarms and converts said data to bit serial data format suitable for transmission over the telephone dial network. The presence of a valid "key signal" on line 31a and three signals on lines 31b, 31c and 31d which are conventionally delivered by a telephone company dial network modem, enable circuit means within the RLC 32 to transmit the aforementioned security status in bit serial data format on line 32a to the telephone company interface 31, once the conventional companion "request to send" signal on line 32b has been presented and acknowledged via signals on 31b, 31c and 31d. The security status, represented by bit serial data, is transmitted over the telephone dial network lines 28 and is delivered to the LLC 26 from the telephone company interface 24 via line 45i. The LLC 26, using circuit means which will be discussed later, converts the bit serial data to parallel data format which indicates, in binary form, the remote site 32 alarm status. Further circuit means within the LLC 26 decode this parallel data and transmit the decoded status to the manual control panel 23 via line 20c, wherein said status is displayed in digital form on the three digit status display 82 as shown in FIG. 2. Up to 255 status codes, each said code being indicative of a particular alarm condition, may be transmitted from each of the remote sites 29 to the central polling location 27 and digitally displayed at the manual control panel 23. Each status code may be preassigned to describe a particular alarm condition or a combination of alarm conditions. For example, the digit combination of 123 could be assigned to indicate activation of an intrusion alarm while the combination of 124 could be assigned to indicate the concurrent activation of intrusion and smoke alarms. A single status code is also assigned to indicate a "normal" condition at a remote site. Thus, when answered, a polling call placed to a remote site results in a response of either an "O. K." status code indicating a normal condition or one of the several "error" status codes indicating an alarm condition.

In the event that an alarm condition exists at remote site 48, the designated status code is transmitted to the LLC 26 whereupon said code is decoded and displayed on the manual control panel 23. Furthermore, the LLC 26, using circuit means to discriminate an "O.K." from an "error" status code, detects the presence of the "error" status code, and thereupon notifies the ADC 20 of the alarm condition via a signal on line 20d. Upon receipt of said signal on line 20d, the ADC 20 suspends the polling sequence and causes a seven digit telephone number and two digit customer number corresponding to the alarm location, to be displayed on the respective digital displays shown in FIG. 2 as telephone number 39 and customer number 83.

To illustrate the foregoing operating principles, assume the telephone number of remote site 48 to be 555–8888 and further assume that an error status code of 123 has been pre-assigned to designate an intrusion type alarm. Under these conditions, activation of an intrusion alarm at remote site 48 would result in the status code 123, the telephone number 555–8888, and the customer number 48, to be concurrently displayed on the manual control panel 23. Further the ADC 20 would halt the polling sequence thereby calling the operator's attention to the alarm condition and permitting the alarm status code and the location thereof to be detected. The polling sequence may then be resumed by toggling a reset-error toggle switch 42 shown in FIG. 2, which causes a signal to be transmitted, as shown in FIG. 1, from the ADC 20 via line 20h to the LLC 26 thereby resetting circuitry contained therein. If, however, an alarm condition does not exist at remote site 48, an "O.K." status code is delivered to the LLC 26 which decodes same and notifies the ADC 20 of the normal condition via a signal on line 20e. The ADC 20 acknowledges the receipt of said signal by transmitting a responsive signal to the LLC 26 via line 20i which unlatches the LLC 26 from communication with the ADC 20, thereby clearing LLC 26 circuitry. Also upon notification of a normal condition, the ADC 20 causes the "call request" signal on line 20a to be dropped, thereby terminating the polling call to remote site 48, and proceeds in the polling sequence by initiating a polling call to the next remote site telephone number in memory 21, namely that of remote site 49.

AUTOMATIC DIAL CONTROLLER AND INTERFACE CIRCUITS

Figure 3:
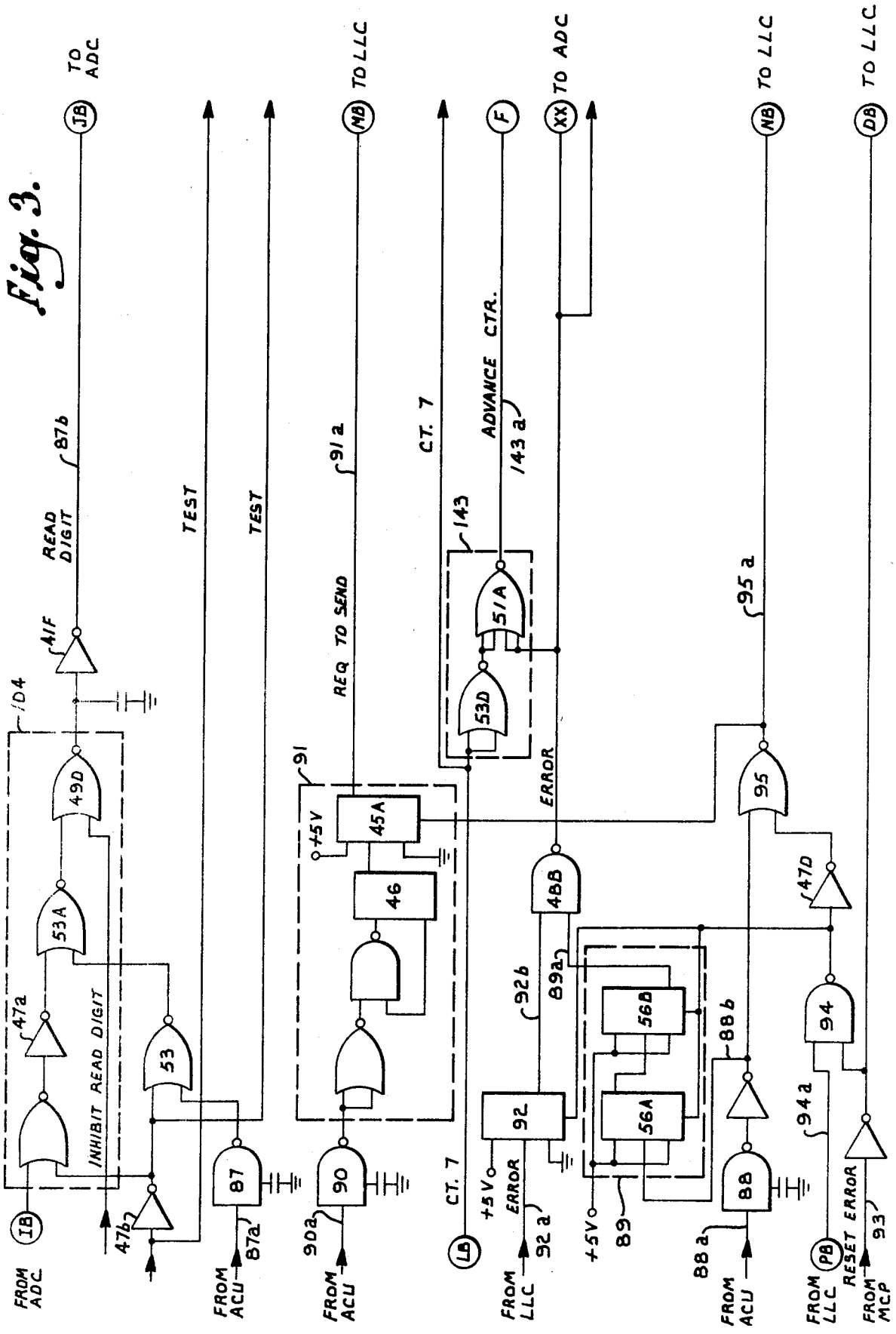
FIGS. 3 and 4 are detailed schematic diagrams of the circuits for electrically interconnecting the automatic dial controller with the local line controller and a telephone company interface.
Figure 4:
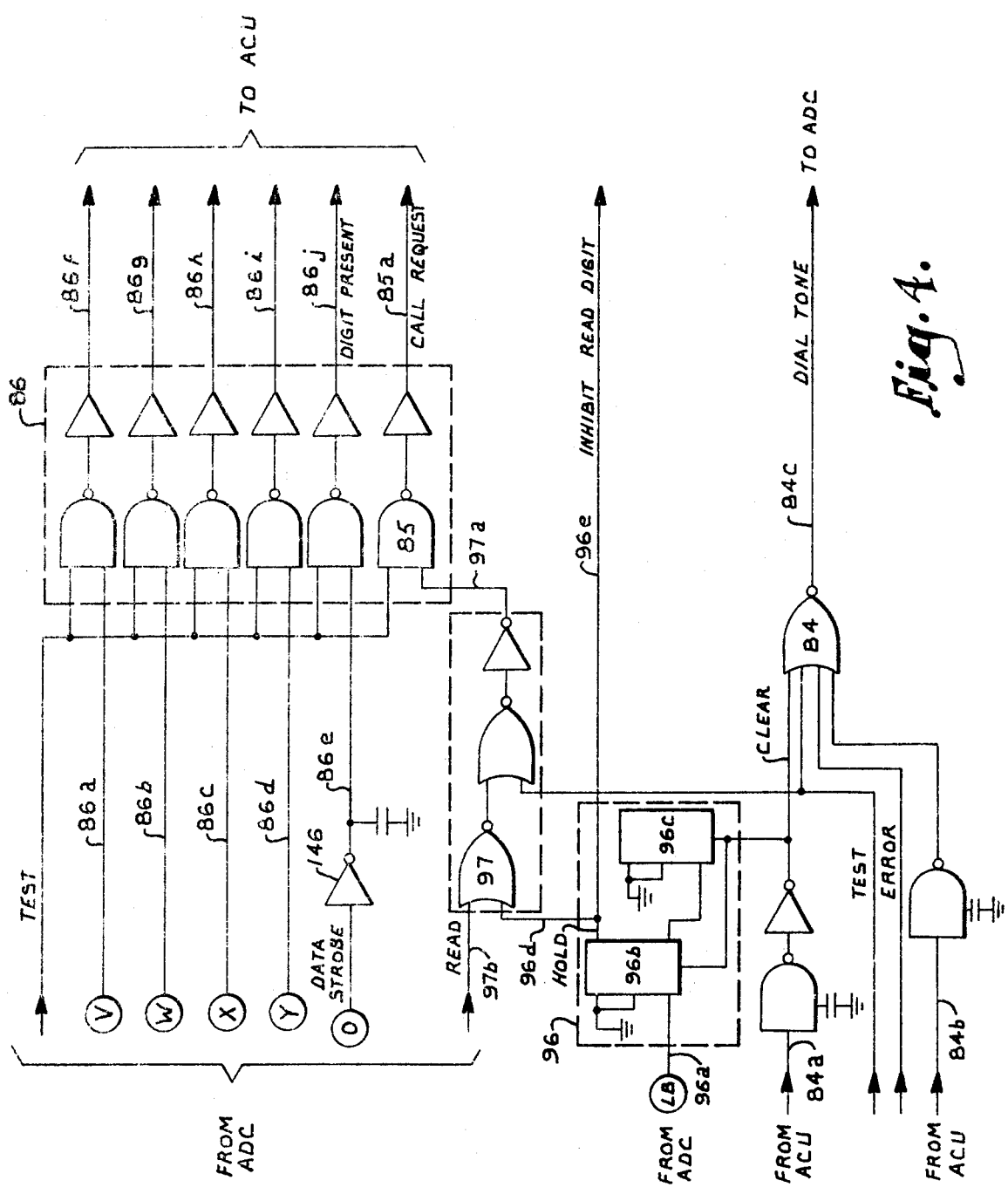

Turning now more particularly to the more detailed circuit diagrams shown in FIGS. 3 through 12, the previously discussed ADC electrical interface (generally indicated by the numeral 25 in FIG. 1) is depicted in FIGS. 3 and 4 while the ADC also discussed previously (and indicated by the numeral 20 in FIG. 1) is shown in FIGS. 5 through 12. Since the detailed circuit diagram must necessarily extend through many figures, interconnections are indicated by capital single or double letters and are carried from one figure to another when appropriate.

As was previously pointed out, the ADC and LLC provide a means at the central polling location to store remote site telephone numbers and communicate with remote sites via ordinary telephone dial networks. My invention achieves this communication by transmitting and receiving digitized data, in serial bit format, over public telephone lines which are more commonly utilized for speech transmission. To accomplish data communication over ordinary telephone dial networks, the apparatus used to transmit and receive communications data must be compatible with standardized data sets, or "modems", used by dial networks, in terms of operating voltage levels and provision for appropriate control signals. As will be pointed out infra, the method and apparatus described herein provide for each of the appropriate control signals and voltage levels in order to attain interface compatibility with ordinary dial telephone networks. For example, dial networks commonly utilize standardized voltage levels in accordance with EIA (Electronic Industries Association) Standard RS-232-C, for the purpose of allowing interchangeability of terminal apparatus at the data set or "modem" interface. My invention utilizes a number of interface convertors such as those indicated by the numeral 86 as shown in FIG. 4 to convert signal levels from the typical 5 volt logical lever to the RS-232-C standard electrical interface level. These convertors more commonly referred to as "driver interface circuits" are conventionally manufactured integrated circuits such as a device manufactured by the Texas Instruments Corporation and identified by its number SN75150 with the internal configuration and operating parameters thereof made in accordance with the manufacturers data sheets. Similarly, convertors are used to convert the RS-232-C interface level to the standard 5 volt logic level, such as the device indicated by the numeral 87. These convertors, commonly referred to as "receiver interface circuits" are also conventionally manufactured integrated circuits such as a device manufactured by the Motorola Corporation and identified by its number MV1489AL with the internal configuration and operating parameters thereof made in accordance with the manufacturers data sheets.

As referred to above, apparatus providing input to and using the output from a data-transmission system using a dial telephone network must possess control logic to provide the appropriate control signals commonly used in dial network systems. The ADC interface logic depicted by the detailed schematic diagrams shown in FIGS. 3 and 4 are the circuit means for providing these necessary control signals. For example, signals transmitted from the previously discussed ACU (indicated by the numeral 45 in FIG. 1) are received at the interface in FIG. 4 on lines 84a and 84b, and are then gated through NOR gate 84, thence being delivered to the ADC on line 84c as the common "dial tone" thereby indicating the availability of a telephone line for placement of a polling call. The previously mentioned "call request" control signal is transmitted from the ADC on line through combinational logic 97 and convertor 85, and thence to the ACU on line 85a whereupon the ACU responds to said signal by delivering the "present next digit" control signal on line 87a which is delivered through convertor 87 and subsequent combinational logic 104 wherein a "read digit" control signal is formed and delivered to the ADC on line 87b. The ADC responds to the "read digit" signal by transmitting the first digit of the remote site telephone number, in binary form, on lines 86a, 86b, 86c and 86d, along with a "data strobe" control signal on line 86e. The digit signals are converted to the RS-232-C interface level by convertor array 86 and are received at the ACU on lines 86f through 86j. In the event that the polling call cannot be completed, the ACU transmits a control signal (previously referred to as "abandon call and retry") which is received at the ADC interface on line 88a and converted to logic level by convertor 88. One output of convertor 88 is a signal shown as line 88b which is delivered to error counter 89 (previously discussed and indicated by the numeral 47 in FIG. 1) which, upon reaching the count of two, delivers an "error" control signal via line 89a to the ADC or alternatively, to a general purpose programmed computer. If, however, the polling call is answered at the remote site, the ACU delivers the "data set status" control signal on line 90a which is converted to logic level by convertor 90 and is then delivered to a pulse generator generally indicated by the numeral 91 which consists essentially of a monostable multivibrator in combination with a J-K flip-flop. The output of pulse generator 91 is delivered via line 91a to the LLC which responds to said output pulse by transmitting the previously discussed "key signal" to the remote site. If an alarm condition is detected at the remote site, an "error" status signal is transmitted from the LLC via line 92a to the input of J-K flip-flop 92 whose output is delivered to the ADC on line 92b. Circuit means within the LLC are reset following an "error" signal transmission by means of a signal from the MCP (reference reset error toggle switch 42 shown in FIG. 2) which is delivered to the LLC via line 93. Similarly, an "O.K." status signal transmitted from the LLC is received at the ADC interface on line 94a, and is gated through NAND gates 94 and 95, thereby resulting in a "clear OK" signal being returned to the LLC on line 95a which resets circuit means contained therein. Finally, the ADC terminates the polling call by delivering a signal on line 96a to the input of pulse generator 96, consisting essentially of flip-flops 96b and 96c. The output of said pulse generator 96 is delivered via line 96d through combinational logic 97 whose output on line 97a goes low thereby causing the "call request" control signal to the ACU on line 85b to be dropped and thus terminating the polling call.

Figure 5:
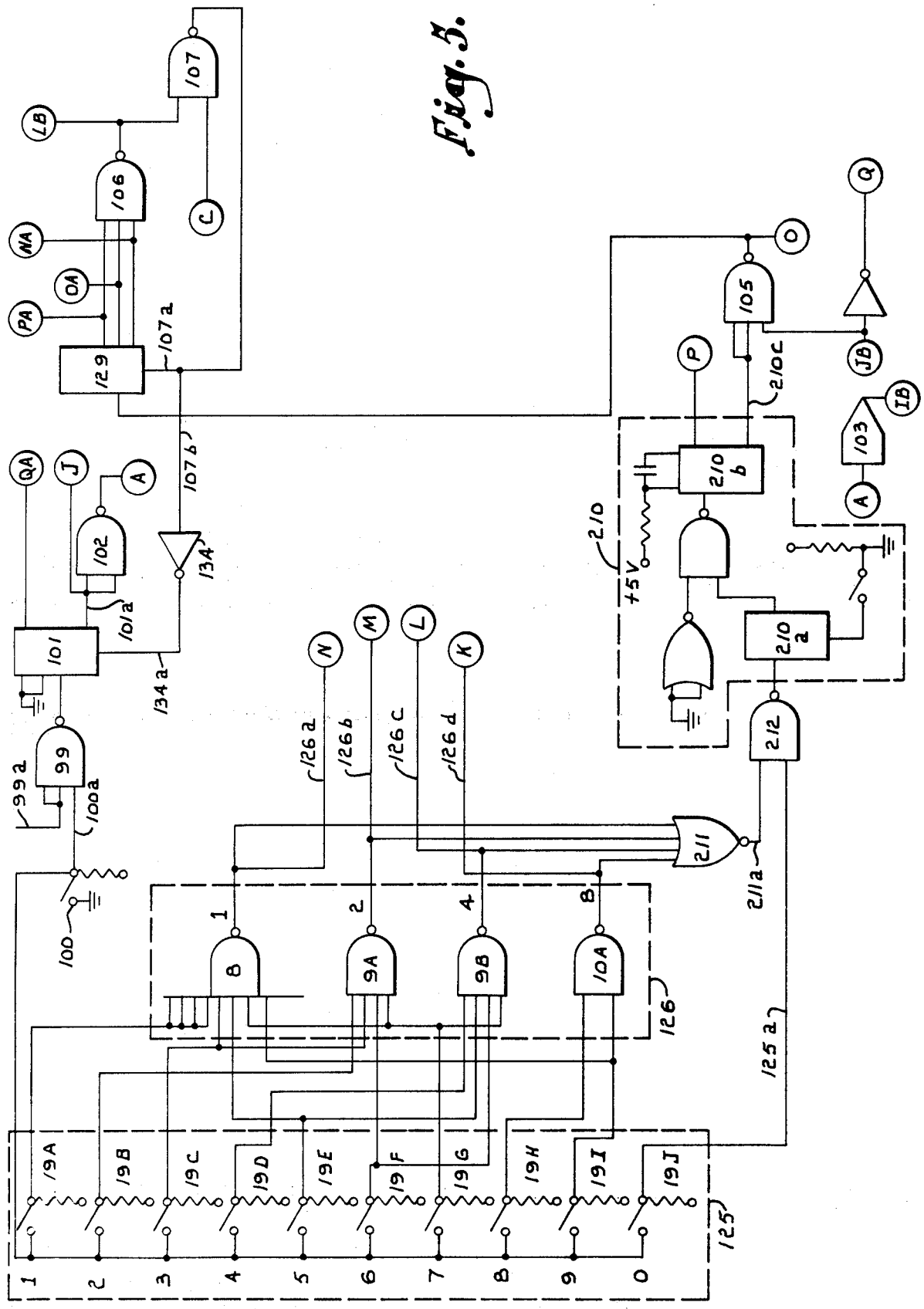
Figure 6:
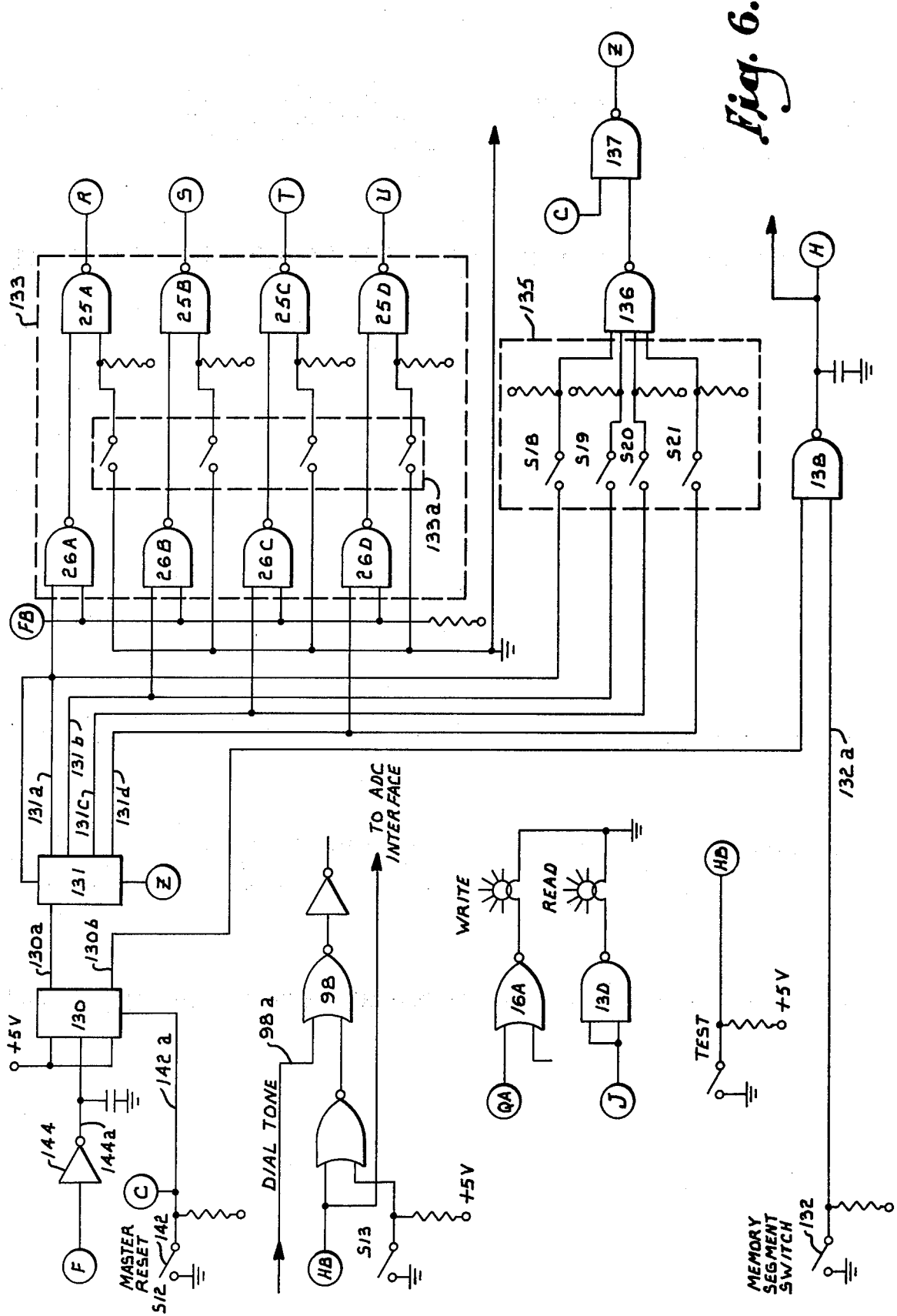

Considering now the ADC detailed circuit diagrams shown in FIGS. 5 through 12, the dial tone signal which is required to initiate the dialing process is received from the ADC interface (reference line 84c, FIG. 4) on line 98a (FIG. 6). The dial tone signal is gated through NOR gate 98, as shown in FIG. 6, and is then delivered to one input of NAND gate 99 shown in FIG. 5 on line 99a, a second input to said gate being connected to read-write switch 100 (previously indicated by the numeral 37 in FIG. 2). Assuming it is desired that telephone numbers be recalled from memory, switch 100 would be toggled to the read position, thereby causing a low to be delivered via line 100a to NAND gate 99 whereupon the output of same goes high, said high being delivered via line 99a to the input of flip-flop 101. This flip-flop responds to the high input by delivering a "read signal" from one of its outputs on line 101a which is simultaneously delivered to interconnection J and, through NAND buffer 102, to interconnection A. The "read signal" is delivered via interconnection J to master clock 103 which converts the "read signal" to a 60 millisecond clock pulse that is delivered via interconnection IB to combinational logic 104 in the ADC interface as shown in FIG. 3, whose output on line 87b is the previously mentioned "read digit" signal. The "read strobe" signal which is delivered via line 105a to the input of counter 129. Counter 129 is a four bit binary counter whose outputs are simultaneously delivered to NAND gate 106 and a plurality of 64 bit random access memory units (as shown in FIGS. 9 through 12 and indicated by the numerals 111 through 124) via interconnections NA, OA and PA. In the present application, counter 129 is utilized to address each digit of a telephone number stored in memory and count the number of digits retrieved therefrom. A binary coded decimal (BCD), corresponding to the number of the digit to be retrieved from memory (one through seven digits) is delivered to the outputs of counter 129 each time said c counter is clocked at its input by the "data strobe" signal on line 105a. The aforementioned interconnections NA, OA and PA are common to the address inputs of each of the several memory units and thus, these interconnections function as a data buss to deliver the BCD output of counter 129 to said memory units; however this BCD is delivered to only one memory location by a selecting means which will be discussed later in more detail. During the polling sequence retrieval of a seven digit telephone number from a particular memory location, a mentioned above, is initiated by the "read digit" signal which is converted to the "data strobe" signal and delivered to the clock input of digit counter 129, thereby advancing said counter to the count of one. This "one count" is delivered, in BCD, to a particular memory location by means of a multiplexer (to be discussed infra) and the first digit of the telephone number stored therein is transmitted by means which will be discussed later to the ACU to be dialed. After dialing this first digit the ACU responds by delivering the "present next digit" signal (reference line 87a shown in FIG. 3) via interconnection JB through NAND gate 105 (reference FIG. 5) thereby causing a second "data strobe" signal to be delivered on line 105a to the input of digit counter 129. Counter 129 is thus clocked a second time thereby advancing same to a count of two, said "two count" being similarly delivered in BCD to the selected memory location whereupon the second digit stored therein is caused to be retrieved therefrom. The successive clocking of digit counter 129, transmission of a BCD to a selected memory location and retrieval of the corresponding digit therefrom, continues until all seven digits have been retrieved from the selected memory location. Upon reaching the count of seven, counter 129 delivers the corresponding BCD of 111 to the selected memory location thereby causing the retrieval of the last digit. Also on the seventh such count, the BCD output of 111 from digit counter 129 results in high signals being transmitted on the output lines from said counter to the three inputs of NAND gate 106, thereby causing the output of said gate to go low. This low output is delivered via line 106a to one input of NAND gate 107, a second input to said gate being a normally high line which is connected via interconnection C to the master reset switch 139 (reference FIG. 6). Thus, when line 106a goes low, the normally low output of NAND gate 107 goes high, said high being delivered via line 107a to the reset input of digit counter 129, thereby resetting same to zero counts. The high output from NAND gate 107 is also delivered on line 107b through invertor 134, the resulting low being delivered on line 134a to the clear input of read-write flip-flop 101 thereby clearing same. It should be noted that flip-flop 101 and digit counter 129 may be alternatively reset by manually toggling the aforementioned master reset switch 142, which similarly causes the normally low output of NAND gate 107 to go high. Returning now to NAND gate 106, the low output of said gate is also delivered via interconnection LB through combinational logic 143 as shown in FIG. 3. In the absence of an error condition, the output of said logic on line 143a remains low and said low is returned via interconnection F as an "advance counter" signal to the input of invertor 144 as shown in FIG. 6. The resulting high output of invertor 144 is delivered via line 144a to one input of flip-flop 130 thereby triggering same and activating further circuit means, which will be discussed later, to retrieve a telephone number from the next location in memory.

Figure 9:
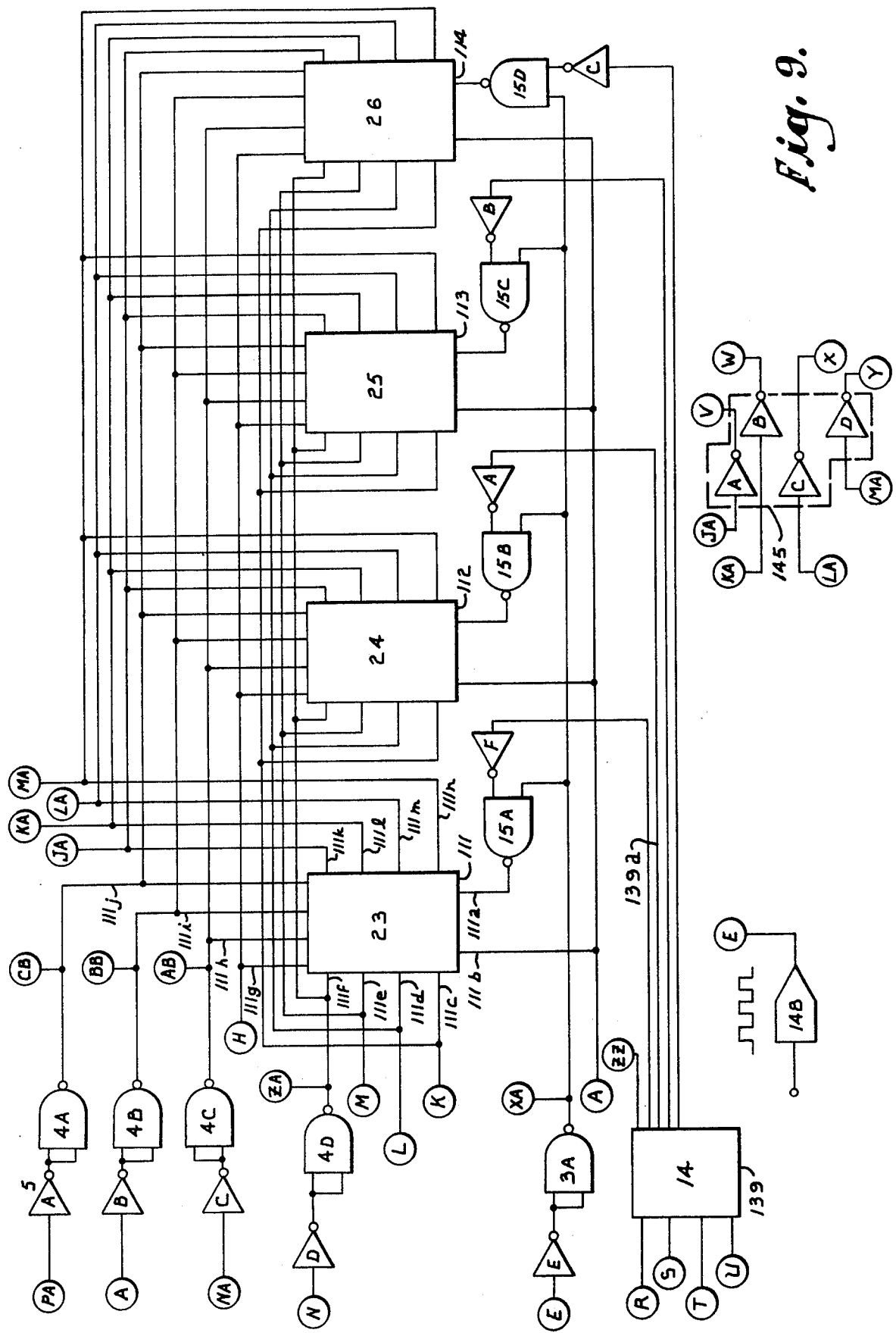
Figure 10:
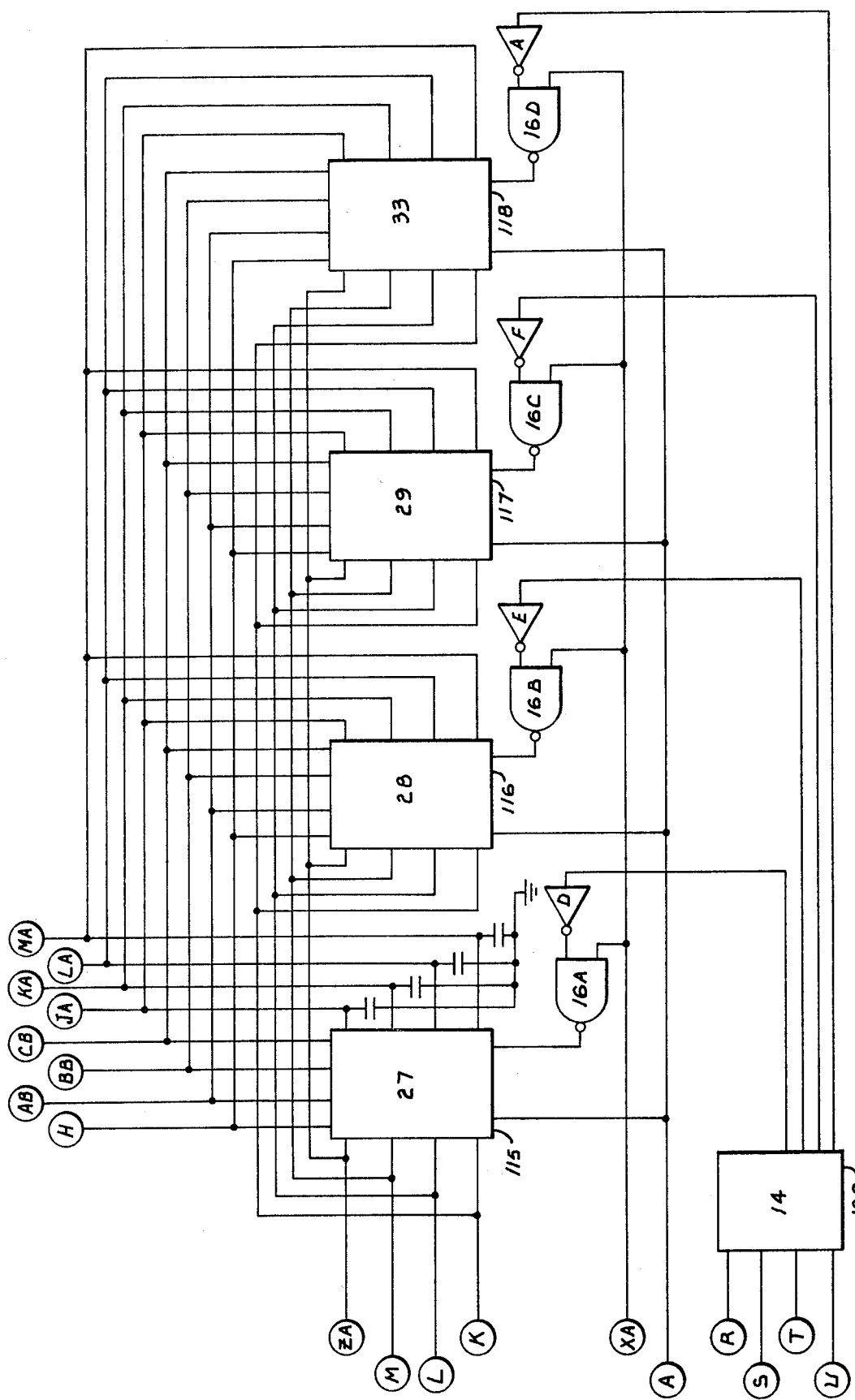
Figure 11:
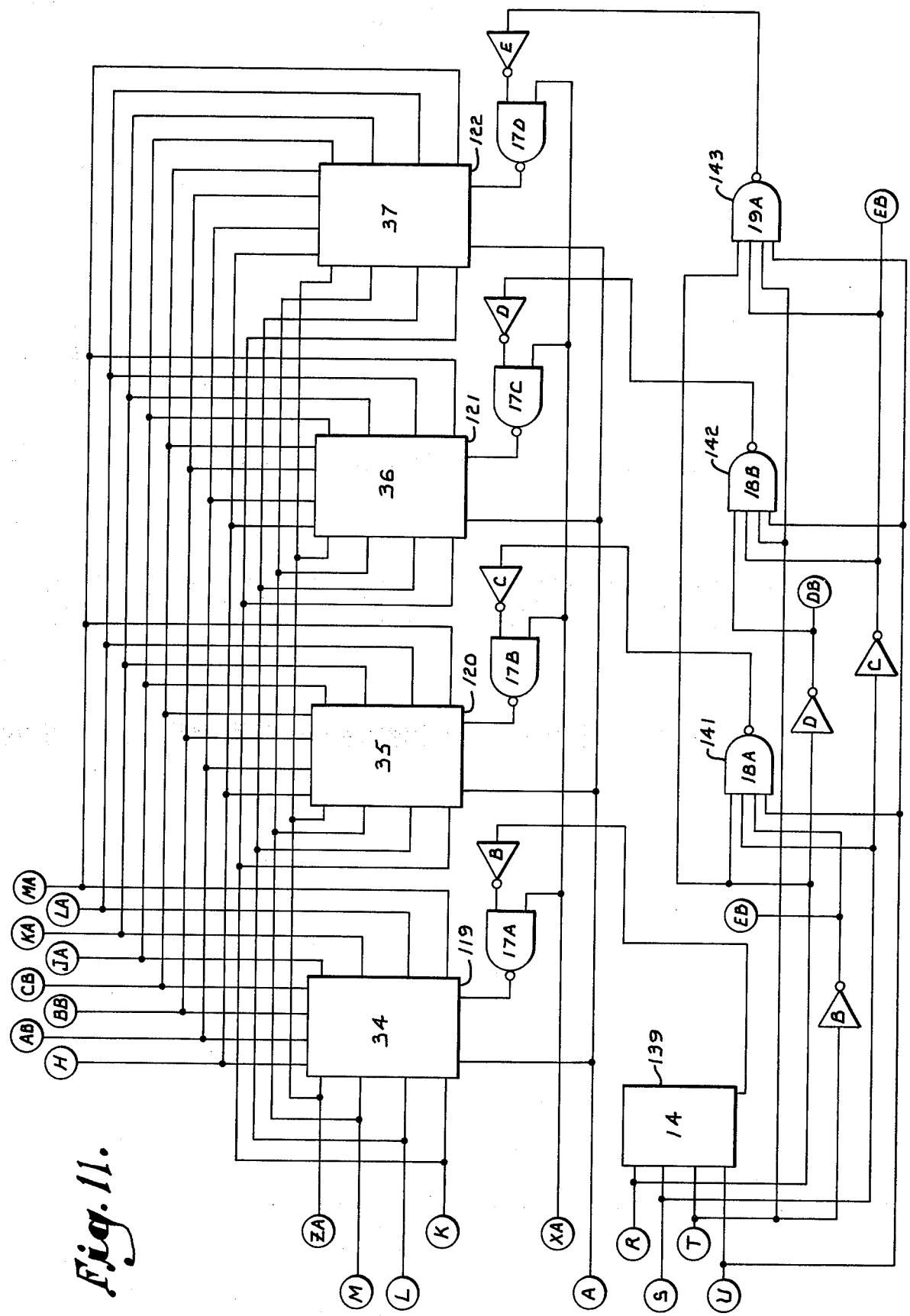
Figure 12:
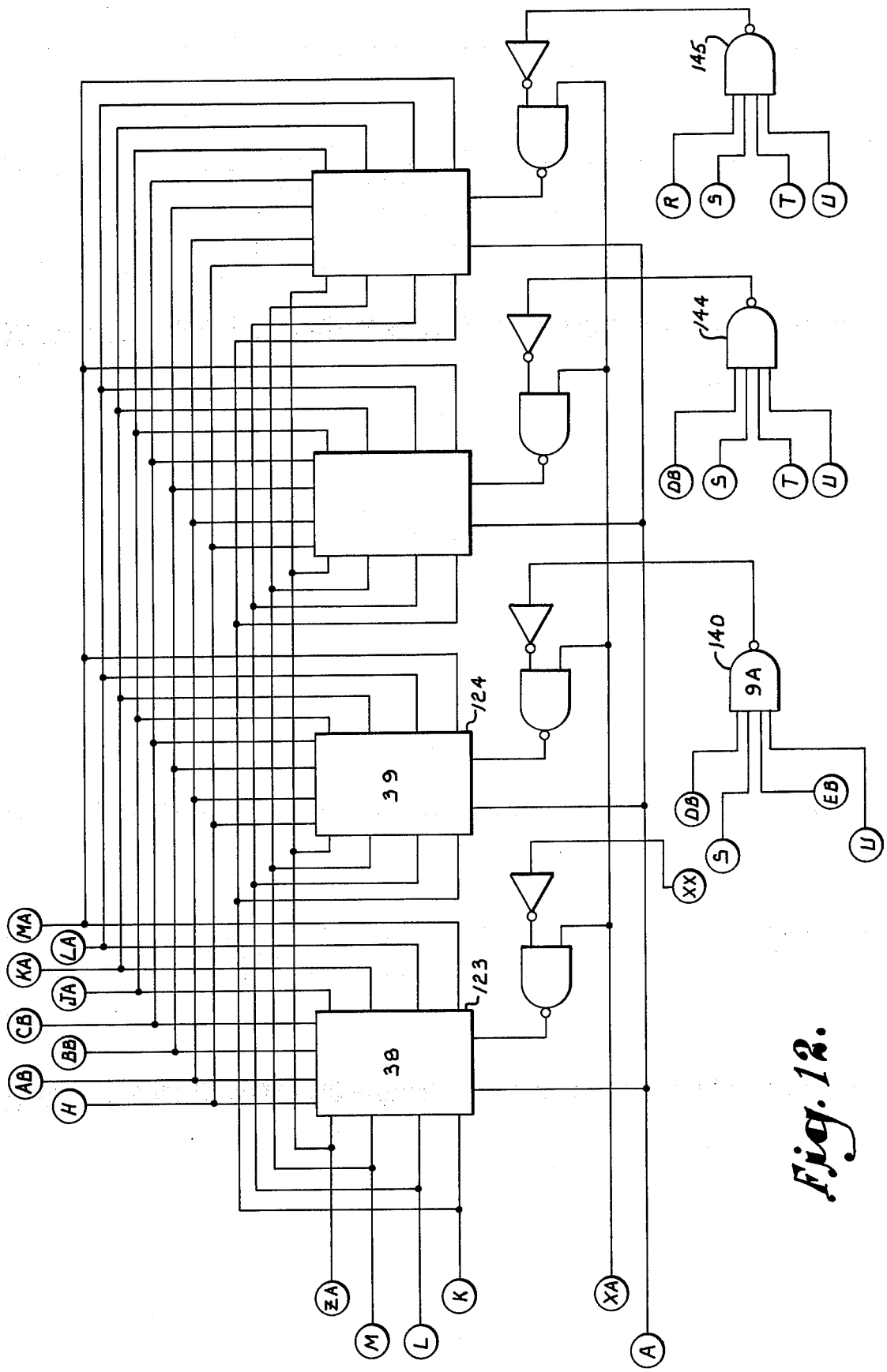

Turning now momentarily to a description of the ADC memory, the invention utilizes sixteen of the aforementioned memory units as shown in FIGS. 9 through 12, each said unit capable of storing sixteen four-bit words, only fourteen of which are being used for 224 four-bit words of storage used. Thus, since storage of a single decimal digit requires one four-bit word, sufficient storage capacity is provided for thirty-two, seven digit remote site telephone numbers. Data buss lines formed by numerous interconnections common to each memory unit, such as each and every interconnection designated by one and two character letters in FIG. 10, connect the individual memory units in such a manner as to form a composite 896 bit memory (224 four-bit words). These data buss lines are employed to transmit command and control signals to the various memory units thereby disposing same to receive data into storage or read out stored data, the input and output of said data likewise being transmitted over the data buss lines. Storage and retrieval of telephone numbers from specific locations within the composite memory is performed in accordance with an addressing scheme which is conceptually depicted in FIG. 13, wherein the entire ADC memory is shown organized into sixteen separate addresses, a single said address indicated by the numeral 108. Each address comprises memory storage for two, seven digit telephone numbers. A single address is selected by manually setting the address switches on the manual control panel (reference FIG. 2, numeral 35) in accordance with the desired address switch setting 109. A particular segment 110, within the previously selected address corresponding to the desired telephone number 111 of a remote site is then selected by appropriate manual positioning the segment switch on the manual control panel (reference FIG. 2, numeral 36). The particular addresses and segments thereof can be selected as described above for the purpose of entering a new telephone number into memory or for merely checking a previously stored number by causing same to be displayed on the MCP. In the polling mode of operation, however, a memory addressing system, which utilizes counter type multiplexing, as well as NAND gates, successively addresses the specific memory segments wherein each telephone number is stored. This memory addressing system includes a four-bit binary counter 129 shown in FIG. 5, and J-K flip-flop 130 functioning in combination with four bit binary counter 131 as shown in FIG. 6. As will be discussed below, counter 131 functions to select a specific address in memory while the flip-flop functions to select a segment within said selected address. The addressing process is initiated by the transmission of an "advance counter" control signal from the ADC interface (reference FIG. 3) on interconnection F through invertor 144 as shown in FIG. 6 to the input of flip-flop 130. This flip-flop is utilized as a segment counter and functions to address the particular segments in memory while also advancing memory address counter 131. Receipt of a high signal on input line 144a triggers the flip-flop causing the normally low output of same on line 130a to go high and the normally high output on line 130b to go low. The high on line 130b is delivered to one input of NAND gate 138, a second input to said gate being line 132a which is connected to the previously discussed memory segment switch 132. Thus, a high signal on the output of NAND gate 138 can be triggered by the output of flip-flop 130 (in the automatic polling mode) or by toggling segment switch 132 (in the manual mode for the purpose of checking or writing telephone numbers into memory). The output of NAND gate 138 is delivered to interconnection H which forms a buss line to the address control inputs of each of the memory units. As mentioned above, a second output from flip-flop 130 is delivered via line 130a to the input of counter 131. This counter functions to select the particular memory unit which is to be addressed. The counter registers one count each time its input is clocked by the output of flip-flop 130. The count number thus registered, up to a count of sixteen, is delivered in binary coded decimals from the ouputs of said counter via lines 131a, 131b, 131c, and 131d to combinational logic array 133, and switch array 135. The value of the BCD output of counter 131 determines which of the sixteen memory unit locations is to be addressed. The four-bit binary number delivered through combinational logic 133 is transmitted via interconnections R. S. T and U to the inputs of a plurality of decoders indicated by the numerals 139, 140, 141, 142, 143, 144, and 145, as shown in FIGS. 9, 10 and 11, respectively. The decoder 139 is essentially a BCD-to-decimal decoder and decoders 140 through 145 are NAND gates which function as multiplexers in the present application wherein the BCD input signals to said decoders, corresponding to the count of counter 131, are decoded by one of said decoders and the resultant decimal output is delivered on an output line which is connected to a specific memory unit. For example, when counter 131 reaches a count of two, the BCD of 0010 is delivered to the four input terminals of each of the decoders. However only decoder 139 has its two's decimal output terminal (indicated by line 139a in FIG. 9) corresponding to the appropriate BCD, connected to a particular memory unit, which in this case is memory unit 112. Thus, a location within memory unit 112 will be addressed each time the count of counter 131 reaches two. Returning to FIG. 6, it should be noted that in the manual mode of operation, specific locations in memory may be addressed by means of the address switch array 133a (previously indicated by the numeral 35 In FIG. 2). Appropriate toggling of these switches duplicates the BCD output of counter 131 and thus provides a means for addressing the various memory locations for the purpose of "writing" telephone numbers into memory or checking the identity of stored telephone numbers by causing same to be visually displayed on the manual control panel. As was previously pointed out, the BCD output from counter 131 is delivered through upper limit switch array 135 (previously indicated by the numeral 41 in FIG. 2). The output from switch array 135 is delivered through NAND gates 136 and 137, thence via interconnection Z to the reset input of counter 131. By appropriately setting the aforementioned toggle switches, the upper limit within the memory which can be addressed is thereby preselected. Stated in another manner, the settings of the toggle switches determine the maximum number of counts registered by counter 131, and upon reaching said maximum count a signal is delivered to an input of said counter thereby resetting same to zero counts. Alternatively, the aforementioned reset signal can be caused to be delivered to counter 131 by means of master reset toggle switch 142 through which a signal is delivered via interconnection C through NAND gate 137, thence via interconnection Z to the reset input of counter 131, thereby resetting same to zero counts. Toggling switch 142 also transmits a signal via line 142a to an input of flip-flop 130 thereby resetting same. Thus, master reset switch 142 resets flip-flop 130 and counter 131 thereby clearing the memory addressing circuitry and returning the polling sequence to address the first telephone number in memory.

Turning now to FIG. 9, a typical memory unit indicated by the numeral 111 is shown with several lines connected thereto. Storage locations within memory unit 111 are addressed by a four-bit binary word which is received on lines 111g, 111h, 111i and 111j via interconnections NA, OA, and PA as shown in FIG. 5 and interconnection H as shown in FIG. 6. Data is "written" into memory on lines 111c, 111d, 111e and 111f via interconnections K, L, M and N (reference FIG. 5) while data is "read" from memory on lines 111k, 111L, 111m and 111n via interconnections JA, KA, LA and MA (reference FIG. 5). The read-write mode of the memory is determined by the combination of high and low control signals that are received on lines 111a and 111b. Data may be written into memory when both control input lines 111a and 111b are low. The signal on line 111b, as received via buss interconnection A from the output of NAND gate 102 (reference FIG. 5), goes low when the previously discussed read-write switch 100 is toggled to the "write" position. In the "write" mode, telephone numbers are written into the particular locations within memory by means of a touch-type, ten decimal digit keyboard (previously depicted in FIG. 2 by the numeral 34) which is generally indicated by switch array 125 as shown in FIG. 5. Depression of the desired digit key causes a high signal to be delivered from the selected key switch to NAND gate array 126 wherein a binary number corresponding to decimal number of the depressed key, is generated and delivered, in binary form, from the outputs of NAND gate array 126 via lines 126a, 126b, 126c and 126d to the data buss formed by interconnections K. L, M and N, thence to a specific storage location within the composite memory in accordance with the previously discussed mutliplexing system and memory addressing scheme. As mentioned above with reference to the multiplexing and memory addressing system, the means for addressing the specific memory locations are activated by the "data strobe" signal as delivered at the output of NAND gate 105. In the "write" mode, the "data strobe" signal is generated by the pulse generator generally indicated by the numeral 210 which consists essentially of a D-type flip-flop 210a operating in combination with monostable multivibrator 210b. Depression of digit keys one through nine in switch array 125 causes a low signal to be delivered to the corresponding gate in NAND gate array 126 thereby causing the output of the same to go high, said high being delivered to one of the four normally low inputs to NOR gate 211. Thus, the normally high output of the NOR gate goes low, said low being delivered via line 211a to one of the two normally high inputs to NAND gate 212, thereby switching the normally low output of same to high. Similarly, depression of the zero digit key causes a low to be delivered via line 125a to NAND gate 212 thereby also producing a high output on said gate. The high output of NAND gate 212 functions to trigger the aforementioned pulse generator 210. In the triggered state, a low output of the pulse generator is delivered on line 210c to one input of NAND gate 105 thus producing a "data stobe" signal on the output of said gate. Finally, in the "write" mode, each digit of the telephone number is also delivered in binary form via the data buss K, L, M and N to the input terminals of shift register 127, shown in FIG. 7, which converts the received parallel binary data to serial data format and transmits said data via output lines 127a to the telephone number display 128 (previously depicted by the numeral 39 in FIG. 2) which will be discussed later in more detail. Returning to the typical memory unit 111 shown in FIG. 9, data may be read out of same (as occurs during the polling sequence) when control input line 111a is low and control input line 111b is high. The signal on line 111b, as received via buss interconnection A from the output of NAND gate 102 (reference FIG. 5) goes high when the previously discussed read-write switch 100 (reference FIG. 5) is toggled to the read position. In the "read" mode, having addressed a particular location within memory unit 111, each digit of a telephone number stored therein is successively delivered in binary form on the output lines 111k, 111L, 111m and 111n to interconnections JA, KA, LA and MA, thence to the inputs of invertor array 145, as shown in FIG. 5. The resulting output signals from these invertors are transmitted via interconnections V, W, X and Y to the ADC interface as shown in FIG. 4, wherein said signals are converted to RS-232-C interface level by the comprising convertors in convertor array 86. The output from these convertors is delivered to the ACU on lines 86f, 86g, 86h and 86i along with the previously discussed "data strobe" signal on line 86j. As pointed out earlier the "present next digit" signal generated by the ACU is received via the ADC interface and delivered on interconnection JB, as shown in FIG. 5, to one input of NAND gate 105. The output from gate 105 is the "data strobe" signal which is delivered on one output line via interconnection O to the ADC interface and inverted by invertor 146, said inverted signal being converted to the RS-232-C level by convertor array 86 and delivered to the ACU on line 86j. The signal on line 86j is the previously mentioned "digit present" signal which is a companion signal to the digit signals on lines 86f through 86*i* and is recognized by the ACU as an indication that a digit has been presented for dialing. As discussed previously, digits are successively retrieved from a selected memory location and presented to the ACU on lines 86*f* through 86*i* until all seven digits have been dialed whereupon the previously discussed counter 129 delivers a "count seven" signal via interconnection LB to the ADC interface. It has been previously pointed out with reference to the memory addressing system, that a "count seven" signal is delivered to the ADC interface, on interconnection LB as shown in FIG. 3, which is converted to an "advance counter" signal that is returned via interconnection F to the ADC and functions to advance the means for memory address contained therein. However, the "count seven" signal is also delivered via interconnection LB to flip-flop combination 96, as shown in FIG. 4. A "count seven" input signal to these flip-flops on line 96*a* causes an output signal to be transmitted on line 96*e* which is delivered to combinational logic 104 (reference FIG. 3) and functions to inhibit the memory addressing system from reading digits from the next memory location until the LLC verifies that an OK status exists at the remote site previously polled.

Figure 8:
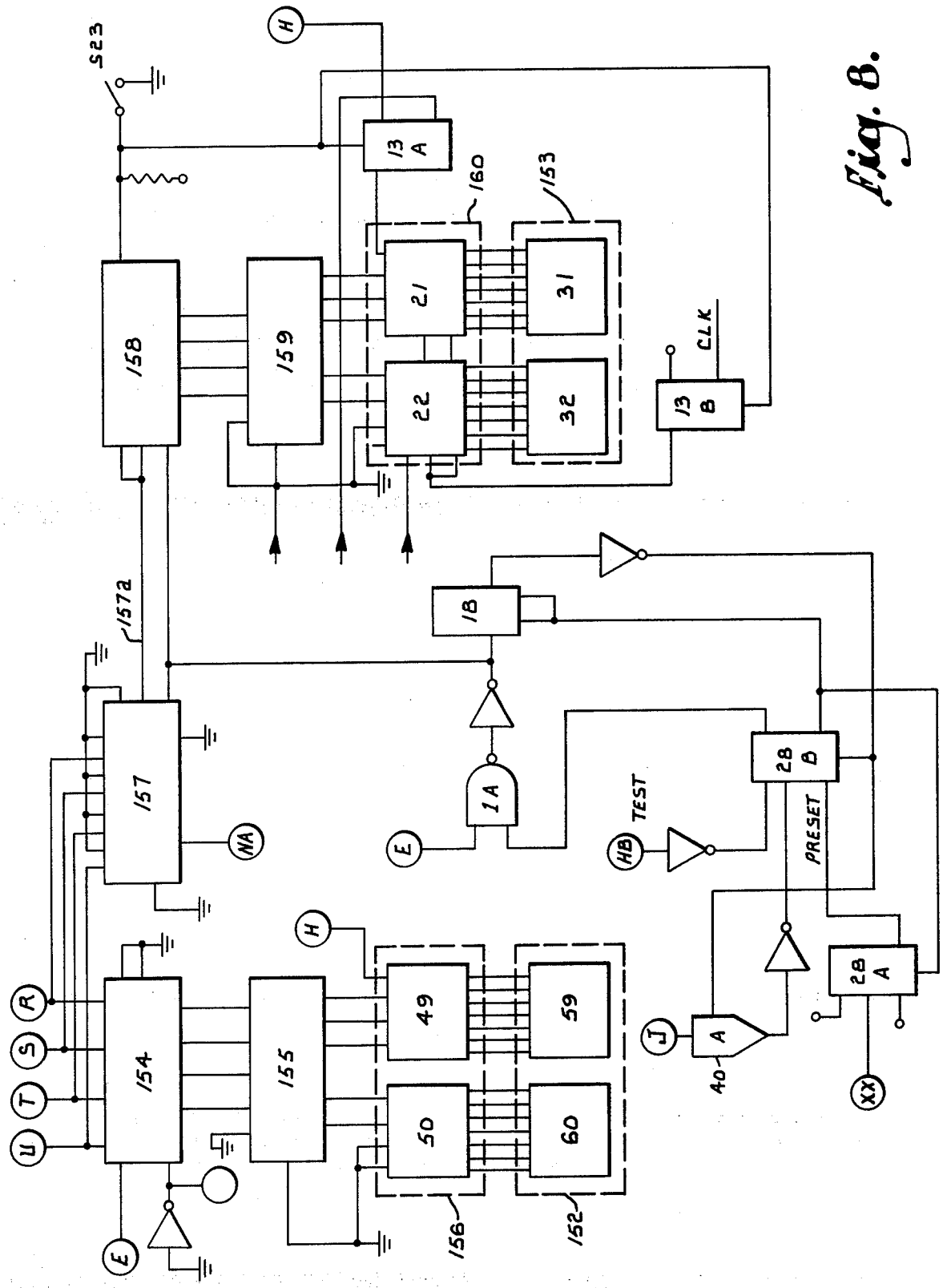

Turning now to FIGS. 7 and 8, several digital displays are provided for visual readout of telephone numbers and error codes, said displays being embodied in the manual control panel (reference FIG. 2). One such display is the seven digit telephone number display 128 as shown in FIG. 7. As previously mentioned with respect to the entry of telephone number into memory (in the "write" mode of operation) each digit of said number is displayed as the digit is written into memory. Similarly, during the polling of a particular remote site (in the "read" mode of operation) each digit of the telephone number thereof is also displayed as the digits are read from memory and transmitted to the ACU for dialing. A four-bit shift register indicated by the numeral 127 has its inputs connected to the previously discussed "read" and "write" memory data busses, and functions to convert the parallel-type data received on said busses to serial-type data. Therefore, a digit being written into memory is delivered to register 127, in binary form, via interconnections K, L, M and N, while a digit being read from memory is delivered via interconnections V, W, X, and Y. The digit thus received is delivered on serial output line 127*a* each time the register is clocked by a pulse on input line 147*b*, said clock pulse being the output of NAND gate 147 whose inputs are a clock pulse derived via interconnection E from timer 148 (reference FIG. 5) and a high signal from the output of flip-flop 149 whose input is triggered by the "data strobe" signal derived via interconnection O from the output of NAND gate 105 (reference FIG. 5). The serial output of register 127 is delivered to an array of 8-bit shift registers indicated by the numeral 150, and more specifically to the serial input of shift register 150*a* within said array. These registers convert the received serial data to parallel type data and further function as a meams for temporary storage of said data. The parallel output of shift register 150*a* is shown emanating from the lower portion of same and is delivered through decoder/driver 151*a* that converts the received BCD parallel input to a seven segment output format which is then delivered to and displayed, in decimal form, on the seven segment light emitting diode (LED) 128*a*. Having displayed the first digit in LED 128*a*, the second digit of the telephone number is similarly delivered from register 127 on line 127*a* to shift register 150*a*. Upon receipt of the second digit, the first digit is shifted within shift register 150*a* such that said first digit is delivered to driver/decoder 151*b* and LED 128*b* while said second digit is delivered to driver/decoder 151*a* and LED 128*a*. Shift registers 150*a*, 150*b*, 150*c* and 150*d* are interconnected such that upon being clocked by signals on lines 147*b* and 147*c*, the integers initially delivered to shift register 150*a* are successively shifted from register 150*a*, thence to register 150*b*, thence to register 150*c*, and finally to register 150*d*, and the respective LED's associated therewith. Thus, upon dialing of the third digit, the first and second digits displayed on LED's 128*a* and 128*b*, respectively, are shifted to LED's 128*b* and 128*c* while said third digit is displayed on LED 128*a*. Two additional displays are shown in FIG. 8 and indicated by the numerals 152 and 153. The input signal sources to these two displays are the outputs of address counter 131 (reference FIG. 6) as delivered via interconnections R, S, T and U, the output of segment flip-flop 130 (reference FIG. 6) is delivered on interconnection H. The output from counter 131 is delivered in BCD through four-bit shift register 154 and is converted to binary form by convertor 155 thence along with the segment signal derived via interconnection H, to driver/decoders 156 and LED display 152. The digits thus presented on display 152 are those corresponding to a particular remote site whose telephone number is being addressed in memory. However, since address counter 131 advances to the subsequent memory location prior to receipt of the security status of the remote site whose memory location was priorly addressed, a second display indicated by the numeral 153 (previously referred to as "error address" and indicated by the numeral 43 in FIG. 2) is provided to indicate the location of a remote site where an alarm has been reported. Signal sources to display 153 are transmitted via interconnections R, S, T and U in parallel format through the four-bit shift register 157 whose serial output is delivered to the eight-bit shift register 158 via line 157*a*. Register 158 renders the serial input data to BCD, which is then converted by convertor 159 to binary form and delivered through decoder/drivers 160 and displayed in decimal form by LED's 153.

LOCAL LINE CONTROLLER CIRCUITS

Located at the central polling location, the LLC is the counterpart to the RLC at the remote site. The LLC functions to communicate with the RLC after the polling call is answered and provides a means to transmit the previously discussed identification key coded signal to the RLC and further provides a means for receiving, decoding and displaying the alarm status code returned from the RLC.

As previously discussed with reference to the ADC interface circuitry (reference FIG. 3), the ACU acknowledges the answering of a polling call placed to a remote site by returning the "data set status" signal on line 90*a* thereby triggering the one shot pulse generator 91 whose output pulse on line 91*a* is the "request to send" signal. Turning now to FIG. 14, the "request to send" signal is delivered via interconnection MB through invertor 163 to one input of NOR gate 161 and constitutes a control directive from the ADC causing the LLC to transmit the key coded signal, as will be discussed presently. Three other inputs to NOR gate 161 shown as lines 162*a*, 162*b* and 162*c* are previously discussed conventional telephone company interface modem signals, to wit "clear to send", "data set ready" and "carrier received", which are delivered to said gate from convertor array 162 wherein said modem signals are converted from RS-232-C level to logic level and inverted to low signals. Thus, the four low inputs to NOR gate 161 result in a high output from same which is delivered to one input of pulse generator 165 (monostable multivibrator). The resulting high output of NAND gate 163 triggers pulse generator 165 which is essentially a one shot monostable multivibrator, whose output is delivered as a strobing signal on line 165a to the transmitter section of a universal asynchronous receiver/transmitter 166. The transmitter section, which is driven by a 4.8 kilohertz clock 167 whose signal is delivered on line 167a, functions to transmit the key coded signal to the RLC. The coded signal is predetermined by the selection of binary data inputs on the eight data bit input lines to the transmitter section as generally indicated by the numeral 168. The key coded signal thus comprises a single eight-bit word whose binary digits are determined by the connection of the corresponding input lines to the constantly high line 165b or the constantly low line 165c. Upon receipt of the strobe signal, the transmitter section delivers the eight-bit, key coded signal in serial bit form on output line 166a through invertor 169, thence to one input of converter 170, a second input to same being a strobing signal provided by the constantly high line 165b. The output of convertor 170 is a RS-232-C level signal which is inverted by invertor 171 with the resulting key output signal being delivered to the telephone company modem on line 171a. However, in order to achieve transmission of the key signal over the dial network a second signal must have been presented to the telephone company modem, namely a "request to send" control signal on line 172a. Transmission of this necessary control signal is controlled by J-K flip-flop 173 with the "clear to send" normally always being asserted and cleared by a signal from NOR gate 220 which is in turn controlled by receipt of data (data available 220a) or "reset error" 220b. The "request to send" signal is reasserted by receipt of previously discussed "clear O.K." signal formed in the ADC interface (reference FIG. 3) and transmitted to the LLC on line 95a via interconnection NB. As shown in FIG. 15, the "clear O.K." signal thus received is delivered via line 173a to a preset input of D type flip-flop 173, thereby triggering same with the resultant pulse output thereof being delivered on line 173b to the input of convertor 174 as shown in FIG. 14. The responding low output from the converter is inverted by invertor 172 to a high "request to send" signal which is delivered to the modem and thereupon causes the transmission to the RLC of the key coded signal present on line 171a. As pointed out earlier, the LLC suspends further operation pending a response from the RLC. This response, which is the security status at the remote site, is deliverdd by the telephone company modem to the LLC on the "received data" line 175 in serial bit format. The data thus received is converted from RS-232-C level to logic level by the respective convertor in convertor array 162 and is delivered via line 162d to one input of NOR gate 176, a second input to same being previously discussed "request to send" signal whose origin is the output of flip-flop 173 (reference FIG. 15). The resultant output from NOR gate 176 is delivered through invertor 177 to the input of the receiver section of the universal asynchronous receiver/transmitter on line 177a. The receiver section, driven by the previously mentioned clock 167 via line 167b, converts the serial bit input data to parallel format data which is representative of the binary status of an alarm condition, and delivers said parallel data to the output terminals of said receiver section, generally indicated by the numeral 178. The parallel data output is simultaneously delivered via common connections indicated by the numeral 179 to both a means for visual display of said data indicated by the numeral 180 and, as shown in FIG. 15, to invertor array 182 and multi-input NAND gate 181. The display means 180 comprises several series connected elements such that the incoming parallel data is converted from binary to BCD by convertors 180a, 180b and 180c, the BCD output of same being delivered through decoder/-drivers 180d, 180e and 180f, thence to LED's 180g, 180h and 180i wherein the status of the remote site alarm is digitally displayed in decimal form. As mentioned above, the parallel data output from the receiver section is also delivered to invertor array 182 and NAND gate 181 which provide a decoding means to discriminate an "O.K." from an "error" status code. By judicious application of invertors on selected incoming data lines to NAND gate 181 the output of said gate is caused to go low when a specific binary number is delivered from the receiver section through the preselected invertor combination such that all the inputs received at said gate are high. For example, in the present case a binary status code of 00000011 has been selected as the "O.K." status code. Therefore, upon delivery of this code through invertor array 182, the zero digits of said code are inverted to ones digits and the resultant inputs to NAND gate 181 are eight high signals thereby causing the output of same to go high. Further, this "O.K." status code is converted to and displayed in the decimal form of 003 by display means 180. Having thus decoded the alarm code, latching circuits are utilized to transmit the alarm status to the ADC. In the event that an "O.K." code is received, the resultant low output of NAND gate 181 is delivered through invertor 183 and received on line 183a as a high input to D-type flip-flop 184.

A second signal is delivered to the clock input of the flip-flop on line 166c, the origin of said signal being a strobing output from the aforementioned receiver section as indicated by line 166b and shown in FIG. 14. The presence of these two high signals at the input of flip-flop 184 triggers same and the output thereof is delivered on line 184a through invertor 185, latching in NAND gate 186, thence through invertor 187 to the ADC interface circuitry (reference FIG. 3) via interconnection PB. If, however, an error code is received, the output of NAND gate 181 remains high and the resulting input to flip-flop 184 is a low signal. Thus flip-flop 184 remains untriggered and the normally high output of same on line 184b latches in NAND gate 188 whose output is delivered to the ADC interface circuitry (reference FIG. 3) via interconnection QB. Flip-flop 184 is reset, after having been triggered by the "clear O.K." which is delivered to the reset input of same on line 184c as derived via interconnection NB from the ADC interface (reference FIG. 3).

REMOTE LINE CONTROLLER CIRCUITS

Located at each remote site alarm installation, the RLC functions to answer the polling call and transmit the alarm security status to the central polling location upon receipt of a key coded signal as delivered by the LLC.

As previously discussed with reference to the LLC circuitry (reference FIG. 14), the LLC transmits the eight-bit binary key coded signal, in serial bit form, on output 117a which is received by the telephone company modem and transmitted over the public dial telephone lines to the remote site. The key coded signal is received at the remote site by the RLC on input line 189, as shown in FIG. 16, and converted from the RS-232-C level to logic level by the respective convertor in convertor array 190. The output from this convertor is deivered through invertor 191 on line 191a to a receiver input of the universal asynchronous receiver/transmitter 192. The receiver section, driven by a 4.8 kilohertz clock 202 whose signal is delivered to said receiver on line 202a converts this serial input to parallel data which is delivered to the output of said receiver on the lines generally indicated by the numeral 193, thence through invertor network 194 to the eight input NAND gate 195. The use of an invertor network in combination with NAND gate 195 performs a decoding function on the incoming eight bit word, similar to that utilized in the LLC circuitry as discussed previously. Thus, the binary key coded signal of 11010011, when transmitted from the receiver section through invertor network 194, is received at the inputs of NAND gate 95 as eight high inputs thereby switching the output of said gate to low. This low output is delivered through invertor 196 and is received via line 196a as a high on the input of J-K flip-flop 197 whose triggered output enables further circuit means to transmit the alarm status to the central polling location. In the triggered state, flip-flop 197 delivers a low via line 197a to one input of NOR gate 201, three other low inputs to same being derived from the telephone company modem signals, "data set ready", "carrier received" and "received data", as received at the RLC on lines 198, 199 and 200. The modem signals thus received are converted from RS-232-C level to logic level and inverted to low signals by convertor array 190, said signals being delivered to the inputs of the aforementioned NOR gate 201. The inputs to NOR gate 201 having gone low, the output of same goes high, said high being delivered through combinational logic 203 to the input of monostable multivibrator 204 thereby triggering same. The output of this multivibrator is received on line 204a as a strobing signal to the transmitter section input of the aforementioned universal asynchronous receiver/transmitter 192. The transmitter section functions to convert the parallel data input to said section representative of the alarm status, and generally indicated by the numeral 205, to serial bit format and transmits same to the central polling location. Thus, upon receipt of the strobe on line 204a, the parallel input data on lines 205 is converted to an eight bit serial word which is transmitted on output line 192a through convertor 206 to the telephone company modem on line 206a. However, in order to achieve transmission of the alarm status over the telephone dial network, the companion "request to send" signal must have also been presented to the modem on line 207a and acknowledged by signals 198, 199 and 200. The "request to send" signal is normally always asserted. It is cleared when all eight bits (one character) have been sent to the LLC. This results in an "end of character" signal on output line 192b through invertor 208 to the clock input of J-K flip-flop thereby triggering same. The resultant high pulse output from flip-flop 209 is delivered via line 209a through converter 207 to the telephone company modem on line 207a thereby clearing the "request to send" control signal. The "request to send" signal is reasserted when flip-flop 209 is reset via line 209b. This reset is accomplished after the "request to send" signal is removed from the telephone company interface. The telephone company interface responds to the removal of "request to send" by removing the "clear to send" 198 signal. Removal of this signal causes flip-flop 209 to be cleared thereby allowing "request to send" to be presented again via a low on line 209a. After transmission of all eight characters, the previously discussed flip-flop 197 is reset to its normal state by an output signal received from the previously mentioned receiver section on line 192b. Upon reset, the output of flip-flop 197 on line 197a goes high thereby disabling the transmitter section from further data transmission.

OPTIONAL MINICOMPUTER CONTROL (DETAILED)

As discussed earlier, the minicomputer or GPPC-80 would be interfaced to the ADC 20 in such a manner that the GPPC could effectively duplicate the functions of the MCP 23.

The specific circuit diagrams to interface the GPPC to the ADC are not provided for in the specification drawings, however the points at which these would be made can be identified. In order to provide the equivalent of keyboard input for the GPCC at the ADC, combinational logic 126 (FIG. 5) would have added gating logic immediately after each of the four NAND gates involved.

Combinational logic would be added after read-write switch 100 and "lamp test" switch in FIG. 5 to interface these inputs to the ADC from the GPPC. To provide for the GPPC to address specific memory locations within the ADC memory, segment switch 132 (FIG. 6) and combinational logic 133 would have additional gating added after each switch. Upper circuit logic 135 would have extra logic gating after each switch to provide GPPC control. The Master Reset 142, Test Switch, and Error Reset Switch (FIG. 3) would have logic gating added for GPPC use.

In order to receive display information, the GPPC would be interfaced to the ADC lines controlling the displays. More particularly the display of the telephone number would be brought from the parallel output side of serial-parallel convertors 150a, 150b, 150c and 150d (FIG. 7). The customer and error number display would be interfaced to parallel outputs of convertors 154 and 158, respectively (FIG. 8).

Furthermore, to determine detail error status from remote customers and be notified of an error condition, the GPPC would interface to the LLC (FIG. 14). To obtain the detail status received from the RLC, the GPPC would receive signals from points 178 from the UAR/T device. The computer would receive notification of an "error" status QB (FIG. 15) via an additional connection to this point.

OPTIONAL MINICOMPUTER (GPC) CONTROL (GENERAL)

Although the ADC 20 is designed to function as a stand alone device, its utility is enhanced and complemented by the use of a minicomputer or GPPC -80. The GPPC-80 would be interfaced to the ADC 20 in parallel with the MCP 23 so that the computer would be provided with a function that duplicates that of each switch on the MCP 23. The computer would also be provided with access to the data displayed by the MCP 23 and the various error indicators. The GPPC-80 interfaced in this manner can duplicate the functions of an operator of the MCP 23. The computer therefore acts as a system monitor and does not become involved with the detailed polling operation of the ADC 20 unless an exception condition should arise, such as an error status received from a remote site 49, or it is desired to enter a new telephone number for a customer. Because of the GPPC-80 inherent capability for storage of larger amounts of data, this capability would be used to hold more detailed information about each customer's alarm installation such as name, address, and physical layouts of the customer's site. Furthermore, the GPPC-80 can monitor numerous ADC 20 units since it need not become involved directly in the detailed polling operations.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. Apparatus for polling security alarm installations, each alarm installation having a remote site telephone number and being interconnected with a conventional telephone dial network, said apparatus comprising:
    a central monitoring station having the combination of an automatic dial controller means and a local line controller means thereat;
    said automatic dial controller means being comprised of a memory unit means for storing remote site telephone numbers, a manual control panel means for entering said telephone numbers in said memory unit means and for displaying said telephone numbers, and logic circuitry means for controlling the polling sequence operation by repeatedly retrieving said remote site telephone numbers from said memory unit means in a set sequence, automatically dialing the retrieved telephone number and requesting delivery of security status information to said central monitoring station from the alarm installation corresponding to the dialed telephone number;
    said local line controller means being operable to receive and process security status information delivered to said control monitoring station from said alarm installations;
    means interconnecting said automatic dial controller means and said local line controller means with said telephone dial network;
    a remote line controller means for collecting security information from said alarm installations and for transmitting said information to said central monitoring station upon request; and
    means interconnecting said remote line controller means with said telephone dial network, said automatic dial controller means and local line controller means thereby effecting the polling of each of said alarm installations and said remote line controller means being operable to collect security information and transmit same to said central monitoring station.

2. The combination as in claim 1, wherein said logic circuitry means includes a means for causing said telephone numbers to be displayed on said control panel as said numbers are polled.

3. The combination as in claim 1, including means for determining the address of the location of each remote site telephone number stored in said memory unit.

4. The combination as in claim 3, wherein said address determining means includes a plurality of binary coded address switches which correspond to predetermined memory storage scheme.

5. The combination as in claim 1, including means for manually initiating the polling of said installations.

6. The combination as in claim 5, including means for causing the polling of only preselected ones of said telephone numbers.

7. The combination as in claim 1, including means for causing the polling of only preselected ones of said telephone numbers.

8. The combination as in claim 1, including means for interfacing an automatic calling unit with said automatic dial controller means and said local line controller means, said automatic calling unit being operated in accordance with said output signal means from said automatic dial controller means and said local line controller means to poll said remote installation sites.

9. The combination as in claim 8, wherein said logic circuitry means includes a means for transmitting a call request signal to said automatic calling unit to initiate said polling of said remote installation sites.

10. The combination as in claim 9, including circuit means for requesting that digit information be transmitted from said automatic dial controller means to said automatic calling unit pertaining to said telephone numbers to be polled.

11. The combination as in claim 10, including means for suspending operation of said digit requesting means after a preselected number of digits have been dialed by said automatic calling unit.

12. The combination as in claim 11, including means for producing and transmitting an abandon call and retry signal from said automatic calling unit to said automatic dial controller means, and means for causing said automatic dial controller means to instruct said automatic calling unit to redial a particular number before attempting the dialing of another number.

13. The combination as in claim 12, including means for producing and transmitting a second abandon call and retry signal from said automatic calling unit to said automatic dial controller means, and means for causing said polling sequence to be suspended and to visually display the number associated with the second abandon call and retry signal production.

14. The combination as in claim 8, including means associated with said automatic calling unit for detecting an answer from said remote site, means for producing a data set signal, and means for transmitting said data set signal to said local line controller means thereby indicating to the local line controller means that the remote site installation has answered a corresponding call from said automatic call unit.

15. The combination as in claim 14, wherein said local line controller means includes a means for producing a key signal and a request to send signal as a result of said data set status signal being received by said local line controller means, and means for transmitting said key signal and said request to send signal to said telephone dial network.

16. The combination as in claim 15, wherein said remote line controller means includes a means for determining the validity of said key signal received through said telephone dial network.

17. The combination as in claim 16, wherein said remote line controller means includes a means for converting security status informaton to a suitable format for transmission over a telephone dial network.

18. The combination as in claim 17, wherein said remote line controller means includes a means for transmitting said security status in said proper format to said central monitoring station after receiving said key signal.

19. The combination as in claim 18, wherein said local line controller receives said security status information from said remote line controller means and has means therewithin for decoding said information and transmitting same to said manual control panel means.

20. The combination as in claim 19, wherein said manual control panel includes means for digitally displaying said status information.

21. The combination as in claim 14, including means for interfacing said automatic dial controller means with a general purpose programmable computer, said general purpose programmable computer being operable to supply telephone numbers to said automatic dial controller means, said automatic dial controller means thereby controlling the polling of said number and utilizing said computer only when security information concerning one of the computer numbers was received by said automatic dial controller means.

22. The method of repeatedly polling one or more security alarm installations in succession, said alarm installations having a remote site telephone number and being connected with a conventional telephone dial network, said metod comprising the steps of:
   storing said remote site telephone numbers in a memory unit at a central monitoring station by means of a manual control panel;
   using logic circuitry to repeatedly retrieve said remote site telephone numbers from said memory unit in a set sequence, to automatically dial the retrieved telephone number and to request security status information from the alarm installation corresponding to the dialed telephone number;
   collecting at each alarm installation security information pertaining to said alarm installation;
   transmitting said security information to said central monitoring station in response to a request for security status information from said logic circuitry; and
   processing said security status information at said central monitoring station.

23. The combination as in claim 22, including the step of retrieving only preselected ones of said telephone numbers stored in said memory.

24. The combination as in claim 22, including the step of displaying said security status information at said central monitoring station.

* * * * *